US00RE41024E

(19) United States
(12) Reissued Patent
Alkhatib et al.

(10) Patent Number: US RE41,024 E
(45) Date of Reissued Patent: Dec. 1, 2009

(54) COMMUNICATION USING TWO ADDRESSES FOR AN ENTITY

(76) Inventors: Hasan Alkhatib, 5602 Lakeview Dr., Apt F, Kirkland, WA (US) 98033-7369; Fouad Tobagi, 1183 Laureles Dr., Los Altos, CA (US) 94022; Bruce C Wootton, 1054 Fontana Dr., Alameda, CA (US) 94502

(21) Appl. No.: 12/267,325

(22) Filed: Nov. 7, 2008

Related U.S. Patent Documents

Reissue of:
(64) Patent No.: 7,133,404
Issued: Nov. 7, 2006
Appl. No.: 09/927,911
Filed: Aug. 10, 2001

U.S. Applications:
(60) Provisional application No. 60/224,864, filed on Aug. 11, 2000.

(51) Int. Cl.
*H04L 12/56* (2006.01)

(52) U.S. Cl. ..... 370/392; 370/401; 370/471
(58) Field of Classification Search ..... None
See application file for complete search history.

(56) References Cited

U.S. PATENT DOCUMENTS

| | | | |
|---|---|---|---|
| 5,361,256 | A | 11/1994 | Doeringer et al. |
| 5,623,605 | A | 4/1997 | Keshav et al. |
| 5,717,686 | A | 2/1998 | Schiavoni |
| 5,777,989 | A | 4/1998 | McGarvey |
| 5,751,961 | A | 5/1998 | Smyk |
| 5,781,550 | A | 7/1998 | Templin et al. |
| 5,790,548 | A | 8/1998 | Sistanizadeh et al. |
| 5,805,818 | A | 9/1998 | Perlman et al. |
| 5,805,820 | A | 9/1998 | Bellovin et al. |
| 5,826,014 | A | 10/1998 | Coley et al. |
| 5,856,974 | A | 1/1999 | Gervais et al. |
| 5,867,667 | A | 2/1999 | Butman et al. |
| 5,884,246 | A | 3/1999 | Boucher et al. |
| 5,889,953 | A | 3/1999 | Thebaut et al. |
| 5,898,830 | A | 4/1999 | Wesinger, Jr. et al. |
| 5,913,210 | A | 6/1999 | Call |
| 5,937,162 | A | 8/1999 | Funk et al. |
| 5,937,163 | A | 8/1999 | Lee et al. |
| 5,940,394 | A | 8/1999 | Killian |
| 6,003,084 | A | 12/1999 | Green et al. |
| 6,006,272 | A | 12/1999 | Aravamudan et al. |
| 6,119,171 | A | 9/2000 | Alkhatib |
| 6,496,867 | B1 | 12/2002 | Beser |
| 6,701,437 | B1 | 3/2004 | Hoke et al. |
| 6,886,103 | B1 | 4/2005 | Brustoloni et al. |
| 6,888,837 | B1 | 5/2005 | Cunningham et al. |
| 2002/0026525 | A1 | 2/2002 | Armitage |

FOREIGN PATENT DOCUMENTS

| | | |
|---|---|---|
| EP | 0 817 444 A2 | 1/1998 |
| EP | 0817444 | 5/1999 |

OTHER PUBLICATIONS

Tanenbaum, Andrew S., "Computer Networks", Third Edition, (1996), 1–37.

(Continued)

*Primary Examiner*—Chi H. Pham
*Assistant Examiner*—Soon D. Hyun

(57) ABSTRACT

[The present invention provides for a system] *This document describes embodiments* for communicating with a host using a global address and a local address. [The present invention allows] *These embodiments allow* for the communication to be initiated by an entity outside the host's network. The entity initiating the communication resolves the destination host's domain name into a global address and a local address. Messages are sent to the destination host using both the global address and the local address. In one embodiment, both the global and local address are included in the message by encapsulating IP packets. Some embodiments of the present invention also use pseudo addressing.

40 Claims, 14 Drawing Sheets

OTHER PUBLICATIONS

"Excerpts from Help Section of Microsoft Outlook", pertaining to rules and forwarding email, 1–3.
Borella, M et al., "Realm Specific IP: Protocol Specification", *Internet Draft,* (Mar. 2000), 1–448.
Borella, M et al., "Realm Specific IP: Protocol Specification", (Oct. 2001), 1–55.
Montenegro, G et al., "RSIP Support for End–to–end IPsec", *Internet Engineering Task Force,* (Mar. 2000), 1–17.
Egevang, K et al., "The IP Network Address Translator (NAT)", (May 1994), 1–10.
Cheriton, David R., et al., "A Scalable Deployable NAT–based Internet Architecture", *Stanford University—Computer Science Department,* 1–18.
RFC1631 The IP Network Address Translator (NAT), May 1994.*
Cheriton, Gritter, Triad: A Scalable Deployable NAT–based Internet Architecture, Stanford University Computer Science Department, pp. 1–18, charts pp. 1–34.*
Borella, Lo, Realm Specific IP: Framework, Mar. 2000, pp. 1–33.*
Montenegro, Borella, RSIP Support for End–to–end IPsec, Mar. 2000, pp. 1–19.*
Borella, Brabelski, Lo, Tuniguchi, Realm Specific IP: Protocol Specification, Mar. 2000, pp. 1–48.*
Computer Networks, 3rd Ed., A. Tanenbaum, 1996, pp. 643–670, 685–691.*
RFC 1631, The IP Network Address Translator (NAT), K. Egevang, P. Francis, May 1994.*
Excerpts from Help Section of Microsoft Outlook pertaining to rules and forwarding email. Microsoft Corp. no date.*

* cited by examiner

| Domain Name | Time to Live | Class | Type | Value |
|---|---|---|---|---|
| B.lab.dev.Bcorp.com | 86400 | IN | HINFO | Sun Unix |
| B.lab.dev.Bcorp.com | 86400 | IN | A | $GIP_2$ $LIP_B$ |
| B.lab.dev.Bcorp.com | 86400 | IN | MX | dev.Bcorp.com |

COMMUNICATION USING TWO ADDRESSES FOR AN ENTITY

Matter enclosed in heavy brackets [ ] appears in the original patent but forms no part of this reissue specification; matter printed in italics indicates the additions made by reissue.

This application claims the benefit of U.S. Provisional Application No. 60/224,864, filed on Aug. 11, 2000, which is incorporated herein by reference.

CROSS REFERENCE TO RELATED APPLICATIONS

This application is related to the following Patents/Applications:

DOMAIN NAME ROUTING, U.S. Pat. No. 6,119,171, Sep. 12, 2000;

IPNET GATEWAY, Hasan S. Alkhatib and Bruce C. Wootton, U.S. application Ser. No. 09/167,709, filed on Oct. 6, 1998; and PSEUDO ADDRESSING, Bruce C. Wootton and Hasan S. Alkhatib, U.S. application Ser. No. 09/637,803, filed on Aug. 11, 2000.

Each of the related Patents/Applications are incorporated herein by reference.

BACKGROUND [OF THE INVENTION]

[1. Field of the Invention

The present invention is directed to a system for communicating with entities on a network.]

2. Description of the Related Art

Most machines on the Internet use TCP/IP (Transmission Control Protocol/Internet Protocol) to send data to other machines on the Internet. To transmit data from a source to a destination, the Internet Protocol (IP) uses an IP address. An IP address is four bytes long, which consists of a network number and a host number.

There are at least three different classes of networks currently in use: Class A, Class B and Class C. Each class has a different format for the combination of the network number and the host number in the IP addresses. A Class A address includes one byte to specify the network and three bytes to specify the host. The first bit of a Class A address is a 0 to indicate Class A. A Class B address uses two bytes for the network address and two bytes for the host address. The first two bits of the Class B address are 10 to indicate Class B. The Class C address includes three bytes to specify the network and one byte for the host address. The first three bits of the Class C network address are 110 to indicate Class C. The formats described above allow for 126 Class A networks with 16 million hosts each; 16,382 Class B networks with up to 64K hosts each; and 4 million Class C networks with up to 256 hosts each.

When written out, IP addresses are specified as four numbers separated by dots (e.g. 198.68.70.1). Users and software applications rarely refer to hosts or other resources by their numerical IP address. Instead of using numbers, they use ASCII strings called domain names. A domain name is usually in the form of prefix.name_of_organization.top_level_domain. There are two types of top level domains: generic and countries. The generic domains are com (commercial), edu (educational institutions), gov (the U.S. Federal Government), int (international organizations), mil (the U.S. Armed Forces), net (network providers), and org (non-profit organizations). The country domains include one entry for each country. An example of a domain name is saturn.ttc.com. The term "saturn" is the prefix and may refer to a particular host in the network. The phrase "ttc" is the name of the organization and can be used to identify one or more networks to the outside world. The phrase "com" signifies that this address is in the commercial domain. The Internet uses a Domain Name System (DNS) to convert the domain name to an IP address.

The Internet Protocol has been in use for over two decades. It has worked extremely well, as demonstrated by the exponential growth of the Internet. Unfortunately, the Internet is rapidly becoming a victim of its own popularity it is running out of addresses. Over 4 billion addresses exist, but the practice of organizing the address space into classes wastes millions of addresses. In particular, the problem is the Class B network. For most organizations, a Class A network, with 16 million addresses is too big, and a Class C network with 256 addresses is too small. A Class B network appears to be the right solution for most companies. In reality, however, a Class B address is far too large for most organizations. Many Class B networks have fewer than 50 hosts. A Class C network would have done the job, but many organizations that ask for Class B networks thought that one day they would outgrow the 8 bit host field.

One proposed solution to the depleting address problem is Classless Inter Domain Routing (CIDR). The basic idea behind CIDR is to allocate the remaining Class C networks in varied sized blocks. If a site needs 2,000 addresses, it is given a block of contiguous Class C networks, and not a full Class B network address. In addition to using blocks of contiguous Class C networks as units, the allocation rules for Class C addresses are also changed by partitioning the world into four zones. Each zone includes a predefined number of Class C networks. Although CIDR may buy a few more years time, IP addresses will still run out in the foreseeable future.

Another proposed solution is Network Address Translation (NAT). This concept includes predefining a number of Class C network addresses to be local addresses (also called private addresses). The remainder of the addresses are considered global addresses. Global addresses are unique addresses that should only be used by one entity having access to the Internet. That is, no two entities on the Internet should have the same global address. Local addresses are not unique and are typically used for entities not having direct access to the Internet. Local addresses can be used by more than one organization or network. In the past, a local address could not be used to route on the Internet. Local addresses traditionally can only be used within a private network. NAT assumes that all of the machines on a private network will not need to access the Internet at all times. Therefore, there is no need for each machine to have a global address. A company can function with a small number of global addresses assigned to one or more gateway computers. The remainder of the machines on the private network will be assigned local addresses. When a particular machine on the private network using a local address attempts to initiate a communication to a machine outside of the private network (e.g. via the Internet), the gateway machine will intercept the communication, change the source machine's local address to a global address and set up a table for translation between global addresses and local addresses. The table can contain the destination address, port numbers, sequencing information, byte counts and internal flags for each connection associated with a host address. Inbound packets are compared against entries in the table and permitted through the gateway only if an appropriate connection exists to validate their passage. One problem with the NAT approach is that it only works for communication initiated by a host within the private network to a host on the Internet which has a global IP address. The NAT approach specifically will not work if the communication is initiated by a host outside of the private network and is directed to a host with a local address in the private network.

Another solution that has been proposed is a new version of the Internet Protocol called IPv6 (Internet Protocol version 6, also known as IPng). IPv6 is not compatible with the existing Internet Protocol (IPv4). For example, IPv6 has a longer address than IPv4. Additionally, the IPv6 header is different than the IPv4 header. Because IPv6 is not compatible with IPv4, almost all routing equipment on the Internet must be replaced with updated equipment that is compatible with IPv6. Such widespread replacement of legacy equipment is enormously expensive.

Another proposed solution is the Translating Relaying Internet Architecture Integrating Active Directories (TRIAD). TRIAD includes using a shim protocol between the TCP layer and the IP layer which carries a pair of Internet Relay Tokens (IRTs). An IRT is a potentially opaque variable-length field that extends the addressing beyond that provided by IPv4. The IRTs and the IP headers can include sets of local and global addresses that are changed/shifted at different hops during communication. While TRIAD does help alleviate the diminishing address problem, it requires too many changes to applications, the TCP/IP stack and the various routers along a communication path.

As can be seen, the current proposals to solve the diminishing IP addresses problem are inadequate and/or unduly expensive. Therefore, a system is needed that can effectively alleviate the diminishing IP addresses problem without unreasonable costs.

SUMMARY [OF THE INVENTION]

[The present invention, roughly described, provides for a system] *Embodiments are described* for communicating with an entity using a local address and a global address. This [system] alleviates the diminishing IP address problem discussed above. The present [invention] *embodiments* also allow[s] for communication to be initiated by a source entity outside a private network that is directed to a destination entity using a local address within the private network. The source entity resolves the destination entity's domain name into a global address and a local address. Messages are sent to the destination entity using both the global address and the local address. In one embodiment, both the global address and the local address are included in the message by encapsulating IP packets. Encapsulation reduces the amount of changes needed to be made to the current TCP/IP technology. In another embodiment, pseudo addresses are used so that the socket layer interface can remain unchanged.

One embodiment [of the present invention] includes obtaining a first local address and a first global address for a destination, and creating a message having encapsulation within a single protocol level. The message includes the first local address and the first global address. The message is communicated toward the destination. The inner layer of the encapsulation is used at the destination.

Another embodiment [of the present invention] includes using a domain name to obtain a first local address and a first global address for a destination. A message is created that includes the first local address, the first global address and a first pseudo address. The message is communicated toward the destination based on the first local address and the first global address.

[An] *In* yet another embodiment, a destination receives a message. In some implementations, the message includes encapsulation. Based on the message received, a pseudo address is provided to an application on the destination. The application uses the pseudo address to reference an entity.

[The present invention] *This* can be accomplished using hardware, software, or a combination of both hardware and software. The software used [for the present invention is] *may be* stored on one or more processor readable storage media including a hard disk drive, CD-ROM, optical disk, floppy disk, RAM, ROM or other suitable storage device. In alternative embodiments, some or all of the software can be replaced by dedicated hardware including custom integrated circuits, gate arrays, FPGAs, PLDs, and special purpose computers.

[These and other objects and advantages of the invention will appear more clearly from the following detailed descriptions in which the preferred embodiment of the invention has been set forth in conjunction with the drawings.]

DETAILED DESCRIPTION

Figure 1:
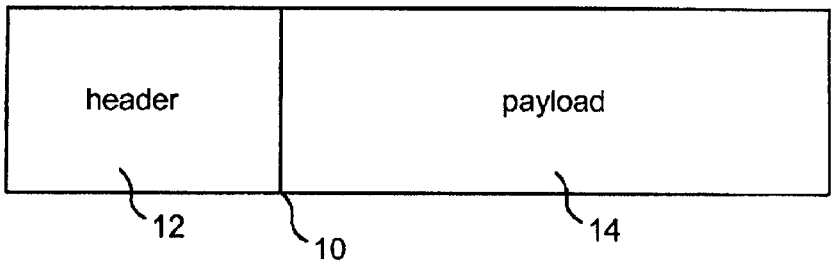
FIG. 1 depicts an IP packet.

The TCP/IP reference model for designing and building a network includes at least four layers: the Physical and Data Link Layer, the Network Layer, the Transport Layer, and the Application Layer. The physical layer portion of Physical and Data Link Layer is concerned with transmitting raw bits over a communication channel. The design issues include ensuring that when one side sends a 1 bit it is received by the other side as a 1 bit, not as a 0 bit. Typical questions addressed are how many volts should be used to represent a 1 bit, how many volts to represent a 0 bit, how many microseconds a bit lasts, whether transmissions may proceed simultaneously in both directions, how the initial connection is established, how it is torn down when both sides are finished, and how many pins the network connector has. The data link portion of Physical and Data Link Layer takes the raw transmission facility and transforms it into a line that appears to be relatively free of transmission errors. It accomplishes this task by having the sender break the input data up into frames, transmit the frames and process the acknowledgment frames sent back by the receiver.

The Network Layer permits a host to inject packets into a network and have them travel independently to the destination. The protocol used for the Network Layer on the Internet is called the Internet Protocol (IP). The main function of the Network Layer is routing packets from a source entity to a destination entity. In most subnets, packets will require multiple hops to make the journey. The Network Layer software uses one or more routing methods for deciding which output line an incoming packet should be transmitted on. There are many routing methods that are well known in the art that can be used in a network layer. For purposes of this patent, no specific routing method is required. Any suitable routing method known in the art will suffice.

The network entity, the process implementing the network layer, receives a segment from the transport layer process. The network entity appends a header to the segment to form a packet. The packet is sent to a router on a network or the Internet. Each router has a table listing IP addresses for a number of distant networks and IP addresses for hosts in the network closest to the router. When an IP packet arrives, its destination address is looked up in the routing table. If the packet is for a distant network, it is forwarded to the next router listed in the table. If the distant network is not present in the router's tables, the packet is forwarded to a default router with more extensive tables. If the packet is for a local host (e.g. on the router's Local Area Network (LAN)), it is sent directly to the destination.

Although every machine in the Internet has an IP address, these addresses alone cannot be used for sending packets because the data link layer does not understand Internet addresses. Most hosts are attached to a LAN by an interface board that only understands LAN addresses. For example, every Ethernet board comes equipped with a 48 bit Ethernet address. Manufacturers of Ethernet boards request a block of addresses from a central authority to ensure that no two boards have the same address. The boards send and receive frames based on a 48 bit Ethernet address. For one entity to transmit data to another entity on the same LAN using an Ethernet address, the entity can use the Address Resolution Protocol (ARP). This protocol includes the sender broadcasting a packet onto the Ethernet asking who owns the particular IP address in question. That packet will arrive at every machine on the Ethernet and each machine will check its IP address. The machine that owns the particular IP address will respond with its Ethernet address. The sending machine now has the Ethernet address for sending data directly to the destination on the LAN. At this point, the Data Link Layer on the sender builds an Ethernet frame addressed to the destination, puts the packet into the payload field of the frame and dumps the frame onto the Ethernet. The Ethernet board on the destination receives the frame, recognizes it is a frame for itself, and extracts the IP packet from the frame.

Transport Layer is designated to allow peer entities on the source and destination to carry on a "conversation." On the Internet, two end-to-end protocols are used. The first one, the Transmission Control Protocol (TCP), is a reliable connection-oriented protocol that allows a byte stream originating on one machine to be delivered without error to another machine on the Internet. It fragments the incoming byte stream into discrete packets and passes each one to the Network Layer. At the destination, the receiving TCP process reassembles the received packets into the output stream. TCP also handles flow control to make sure a fast sender cannot swamp a slow receiver with more packets than it can handle. The second protocol used in the Transport Layer on the Internet, User Datagram Protocol (UDP), is an unreliable connectionless protocol for applications that do not want TCP sequencing or flow control. UDP is used for one-shot, client server type requests-reply queries for applications in which prompt delivery is more important than accurate delivery. The Transport Layer is considered to be above the Network Layer to indicate that the Network Layer provides a service to the Transport Layer. Similarly, the Transport Layer is shown below the Application Layer to indicate that the Transport Layer provides a service to the Application Layer. The Application Layer contains the high level protocols, for example, Telnet, File Transfer Protocol (FTP), Electronic Mail—Simple Mail Transfer Protocol (SMTP), and HyperText Transfer Protocol (HTTP).

Communication in the Internet generally works as follows. The Transport Layer breaks up a stream of data from the Application Layer into a number of segments. The Network Layer, using the Internet Protocol, transports the segments in one or more IP packets from source to destination, without regard to whether these machines or entities are on the same network. Each segment can be fragmented into small units as it is transported. When all of the fragments finally get to the destination machine, they are reassembled by the Network Layer into the original segment. This segment is then handed to the Transport Layer, which inserts it into the receiving process' (Application Layer) input stream.

FIG. 1 depicts the structure of an IP packet 10. IP packet 10 consists of header 12 and payload 14. Payload 14 stores the data received from the Transport Layer.

Figure 2:
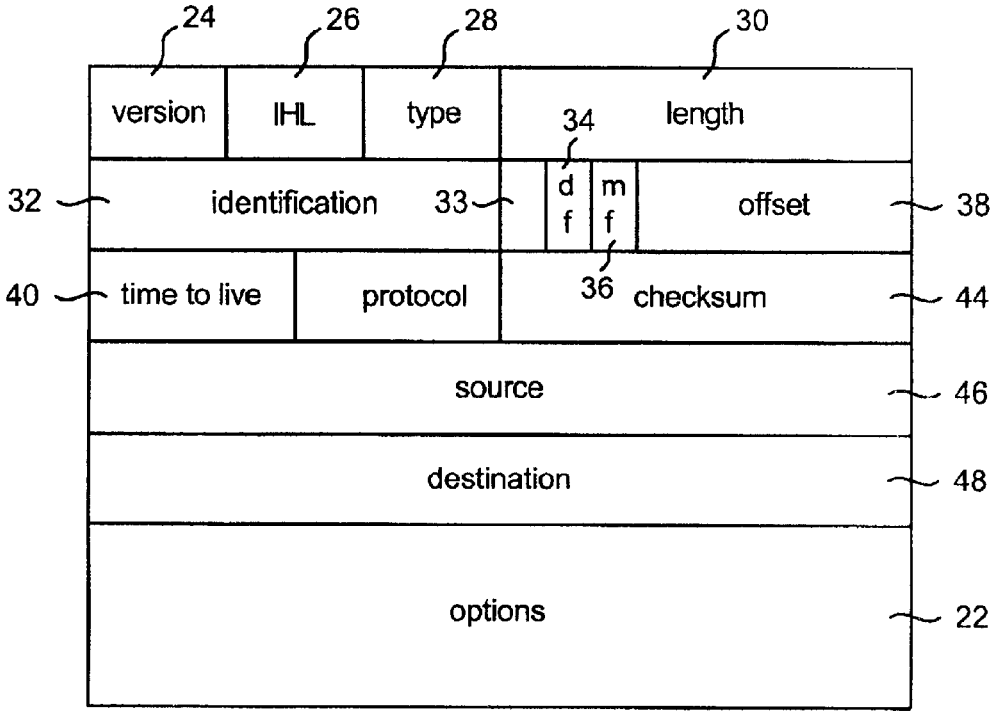
FIG. 2 shows the format of a header of an IP packet.

FIG. 2 depicts the format of a header of an IP packet. The header is depicted to include six rows. Each row is 32 bits wide. The first five rows of the header comprise a 20 byte fixed portion of the header. The last row of the header provides a variable sized Options section 22. Version field 24 keeps track of which version of the protocol the packet belongs to. The current version used on the Internet is version 4. IHL field 26 describes the length of the header in 32 bit words. Type field 28 indicates the type of service requested. Various combinations of reliability and speed are possible. Length field 30 includes the size of the packet, including both the header and the data. Identification field 32 is needed to allow the destination host to determine which segment the received fragment belongs to. All fragments of a segment contain the same identification value. Next comes three flags, which include an unused bit 33 and then two 1 bit fields 34 and 36. In one embodiment [of the present invention], the unused bit 33 is used to indicate that the packet was created [according to the present invention] and is storing both a global address and a local address for the destination. DF field 34 stands for don't fragment. It is an order to the routers not to fragment the segment because the destination is incapable of putting the pieces back together again. MF field 36 stands for more fragments. All fragments except for the last one have this bit set. Fragment offset field 38 indicates where in the current segment this fragment belongs. Time to Live field 40 is used to limit packet lifetime. It is supposed to count time in seconds, allowing a maximum lifetime of 255 seconds. In practice, it may count hops. The time is decremented on each hop by a router. When the time to live hits 0, the packet is discarded and a warning is sent back to the source using an Internet Control Messaging Protocol (ICMP) packet. This feature prevents packets from wandering around forever. Protocol Field 42 indicates which transport layer type is to receive the segment. TCP is one possibility, UDP is another. [The present invention is] *Embodiments are* not limited to any particular protocol. Checksum field 44 verifies the header. One method for implementing a checksum is to add up all 16 bit half words as they arrive and take the ones compliment of the result. Note that the checksum must be re-computed at each hop because the Time to Live field 40 changes. Source field 46 indicates the IP address for the source of the packet and destination field 48 indicates the IP address for the destination of the packet.

Options field 22 is a variable length field designed to hold other information. Currently, options used on the Internet indicate security, suggested routing path, previous routing path and time stamps. In one embodiment [of the present invention], it is contemplated that the source and the destination's local address are added to Options field 22. In some alternatives, the two local addresses can be encoded, compressed, encrypted or otherwise altered to provide more efficient use of storage space, security or compatibility. In embodiments where the address is encoded, encrypted, compressed, etc., the information stored is said to represent the address. That is, an entity can read that information and extract (or identify) the address from that information.

In another embodiment, the local addresses of the source, destination or both are added to the end of the data portion of a packet as a trailer. In this case, Length field 30 needs to account for the extra bytes added at the end of the data field. Legacy routers can treat this trailer as an integral part of the data field and ignore it. In yet another embodiment, source field 46 and destination field 48 can be enlarged to 64 bits each so that they each can store a local address and a global address.

Figure 3:
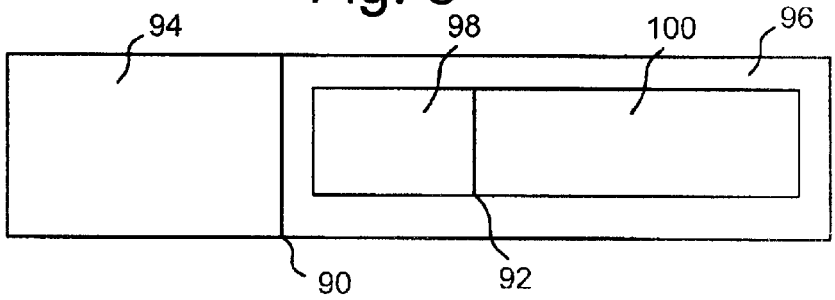
FIG. 3 depicts a first packet encapsulated within a second packet.

In another embodiment [in the present invention], the local address and global address of an entity are both stored in a packet by utilizing encapsulation. That is, one IP packet is encapsulated inside the payload of another IP packet. For example, FIG. 3 depicts two IP packets 90 and 92. Packet 90 has the header portion 94 and payload 96. Packet 92 has a header portion 98 and a payload 100. Packet 92 is encapsulated inside packet 90. That is, packet 92 is stored inside payload portion 96 of packet 90.

Rather than use the entire set of global addresses for a Class A, B or C network, the present invention allows each corporate entity or network to be assigned one or a small number of global address to be used by a gateway. A gateway is an entity that connects a network to the Internet (or another network). Each of the hosts on the network can be assigned a local address. The same local addresses can be used by many different networks. When a source entity sends data to a destination entity with a local address, the data is sent to the global address for the destination's network. The data also includes an indication of the local address of the destination entity. The gateway associated with the global address receives the data and forwards it to the entity associated with the local address within the data. Thus, communication with an entity using local address can be initiated by an entity outside the network. In addition, the gateway receiving the data and forwarding it to the entity does not need to perform multiple domain name resolutions, and the structure of the IP packet has not been changed.

Figure 4:
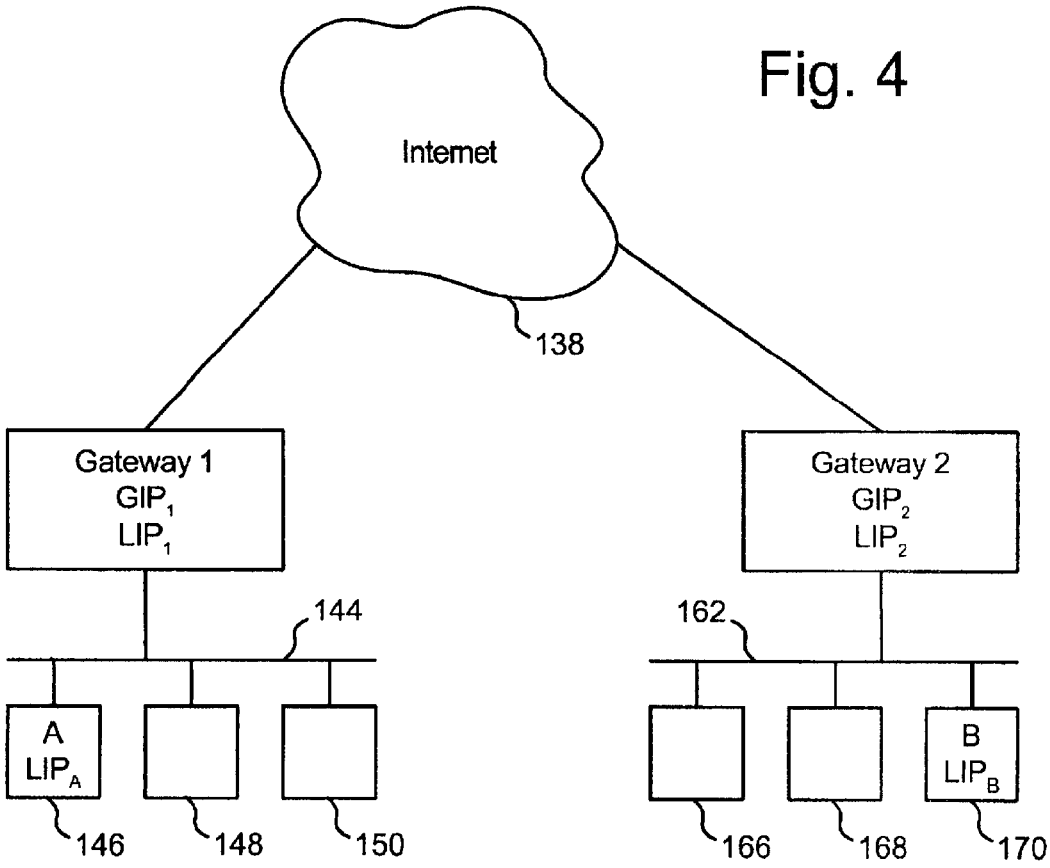
FIG. 4 is a block diagram of two networks connected to the Internet.

FIG. 4 shows two networks connected to Internet 138. The first network includes Gateway 1 which has a global address $GIP_1$ and a local address of $LIP_1$. Gateway 1 is connected to a private network 144 which is made up of a number of entities using local addresses. FIG. 4 shows three entities 146, 148 and 150; however, more or less than three entities can also be used. Entity 146 is labeled as A, and has a local address of $LIP_A$. Entity A does not have a global address.

FIG. 4 shows Gateway 2 connected to Internet 138 and to private network 162. Gateway 2 has a global address of $GIP_2$. FIG. 4 shows part of network 162 including three entities 166, 168 and 170; however, more or less than three entities can be used. Entity 170 is labeled as B and has a local address of $LIP_B$. In the description below, examples will be made referring to the entities depicted in FIG. 4. Other configurations will also work [with the present invention]. [The present invention allows] *Some embodiments allow* entity A ("A") to initiate a communication with entity B ("B") by using both the global address for Gateway 2 ($GIP_2$) and the local address for B ($LIP_B$). Similarly, B can initiate communication with A utilizing the global address for Gateway 1 ($GIP_1$) and the local address for A ($LIP_A$). FIG. 4 shows two gateways in the path between entity A and entity B. In other embodiments, more or less than two gateways can be in the path between entity A and entity B.

For example purposes only, the remainder of the discussion assumes that a message is being sent from A 146 to B 170. For example purposes, it is assumed that A and B are computers. Alternatively, A and B can be other electronic devices that can communicate on the Internet.

Typically, when an application seeks to establish communication with an entity on Internet, the application is only in possession of the entity's domain name. The application makes a call to a resolver process, which converts the domain name to an IP address. Every domain, whether it is a single entity or a top level domain, has a set of resource records associated with it. For a single entity, the most common resource record is its IP address. When a resolver process gives a domain name to the domain name system, it gets back the resource records associated with that domain name.

A resource record has five fields: domain name, time to live, class, type and value. The time to live field gives an indication of how stable the record is. Information that is highly stable is assigned a large value such as the number of seconds in a day. The third field is the class. For the Internet the class is IN. The fourth field tells the type of resource record. One domain may have many resource records. There are at least eight types of resource records that are important to this discussion: SOA, A, MX, NS, CNAME, PTR, HINFO, and TXT. The value field for an SOA record provides the name of the primary source of information about the name server zone, e-mail address of its administrator, a unique serial number and various flags and time outs in the value field. The value field for an A record holds a 32 bit IP address for the host. The value field for the MX record holds the domain name of the entity willing to accept e-mail for that particular domain name. The NS record specifies name servers. The CNAME record allows aliases to be created in the value field. A PTR record just points to another name in the value field, which allows look up of an IP address for a particular domain name. The value field of the HINFO record indicates the type of machine and operating system that the domain name corresponds to. An example of resource records for an entity, according to one embodiment [of the present invention], is found in FIG. 5.

Figures 5, 6:
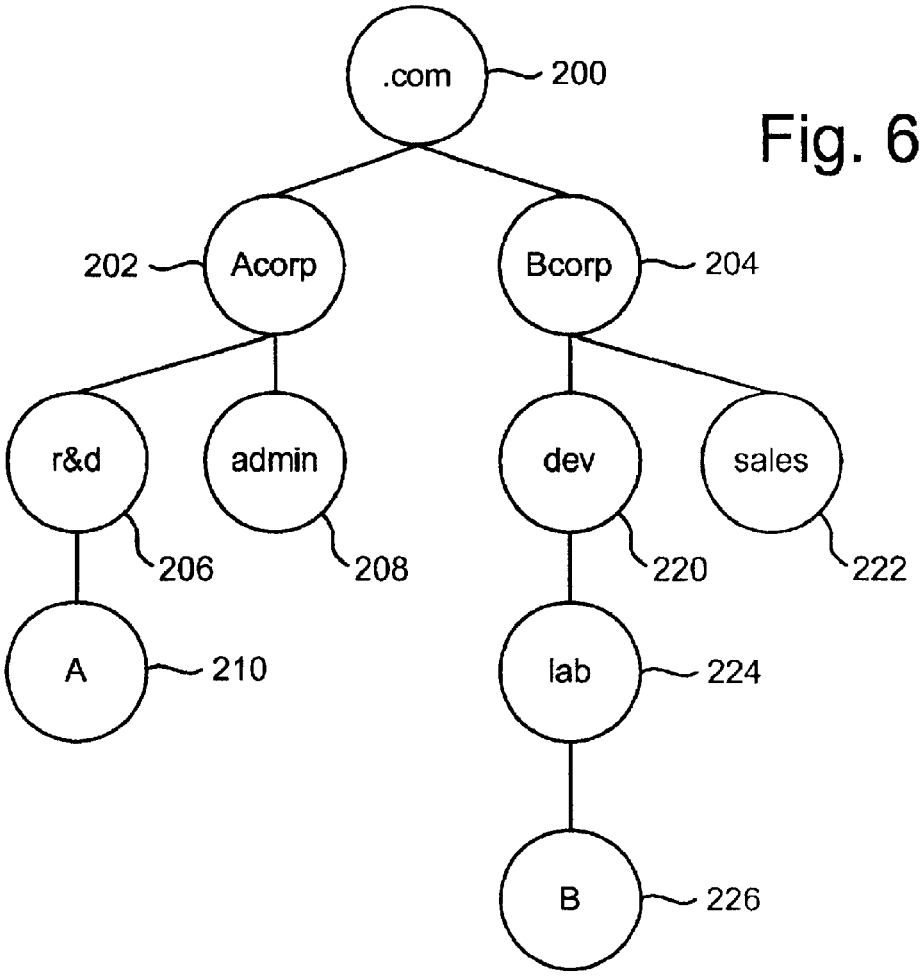
FIG. 5 depicts a portion of a DNS database.
FIG. 6 depicts a portion of a DNS name space.

The table of FIG. 5 includes three resource records for an entity with a domain name of B.lab.dev.Bcorp.com. The first resource record indicates a time to live of 86,400 seconds (one day). The type of record is HINFO and the value indicates that the entity is a computer from Sun Microsystems running the UNIX operating system. The second line is a resource record of type A, which indicates that the global address for B.lab.dev.Bcorp.com is $GIP_2$ and the local address is $LIP_B$. Thus, B.lab.dev.Bcorp.com is entity B 170 of FIG. 4. The third line indicates that e-mail for B.lab.dev.Bcorp.com should be sent to dev.Bcorp.com. It is likely that there will be a DNS record, which indicates the IP address for dev.Bcorp.com.

The first row of data in table 5 (type of HINFO) and third row of data table FIG. 5 (type of MX) are depicted as standard DNS table entries. The second row of the table of FIG. 5 (type is A) is a modification of the standard DNS record. The standard DNS record only includes the global IP address. In one implementation [of the present invention], the DNS table structure is changed (e.g. as per FIG. 5) to store both a global IP address and a local IP address. In another embodiment, resource record A only stores the global IP address and a new type of resource record is created to store the local IP address.

The DNS name space is divided into non-overlapping zones. Each zone is some part of the Internet space and contains name servers holding the authoritative information about that zone. Normally, a zone will have one primary name server and one or more secondary name servers which get their information from the primary name server. When a resolver process has a query about a domain name, it passes the query to one of the local name servers. If the entity being sought falls under the jurisdiction of that name server, then that domain name server returns the authoritative resource record. An authoritative record is one that comes from the authority that manages the record. If, however, the entity is remote and no information about the requested host is available locally, the name server sends a query message to the top level name server for the entity requested. The top level name server will then provide the resource records to the local name server which may cache the information and forwarded it to the original resolver process. Since the cached information in the local name server is not the authoritative record, the time to live field is used to determine how long to use that information.

FIG. 6 shows a portion of exemplar DNS name space within the .com domain or zone. FIG. 6 shows five levels in the domain space; however, in reality it can be much more than five or less than five levels. Additionally, FIG. 6 shows two domain entities directly below the primary name server (.com). However, in reality there can be many entities below the .com level. FIG. 6 is used to provide an example for teaching [the present invention] *some embodiments*. FIG. 6 shows .com entity 200. Directly below .com entity 200 is server 202 with a domain name of Acorp.com and server 204 with a domain name of Bcorp.com. Below server 202 is entity 206 and entity 208. The domain name for entity 206 is r&d.Acorp.com and the domain name for entity 208 is admin.Acorp.com. Below entity 206 is entity 210 which has a domain name of A.r&d.Acorp.com. Note that entity 210 corresponds to entity A 146 of FIG. 4. Thus, the domain name for entity A is A.r&d.Acorp.com.

The entities below server 204 include entity 220 and entity 222. The domain name of entity 220 is dev.Bcorp.com and the domain name of entity 222 is sales.Bcorp.com. Below entity 220 is entity 224, which has a domain name of lab.dev.Bcorp.com. Below entity 224 is entity 226, which has a domain name of B.lab.dev.Bcorp.com. Entity 226 corresponds to entity B 170 of FIG. 4. Thus, B has a domain name of B.lab.dev.Bcorp.com. In one embodiment, entities 202, 204, 206, 208, 220, 222 and 224 can all be domain name servers. Entity 206 corresponds to Gateway 1 and entity 224 corresponds to Gateway 2 of FIG. 4.

In the example where A (of FIG. 4) seeks to initiate communication with B, A is aware of B's domain name (e.g., B.lab.dev.Bcorp.com); however, A is not aware of the local address or the global address for B. In order to obtain the global and local addresses, A must use the domain name resolution process. In prior art systems, A can provide a domain name of B to a domain name resolver and the domain name resolver will provide A with the global IP address of B. In one alternative [of the present invention], the resolving process will return both the global address and the local address for a given domain name.

Figure 7:
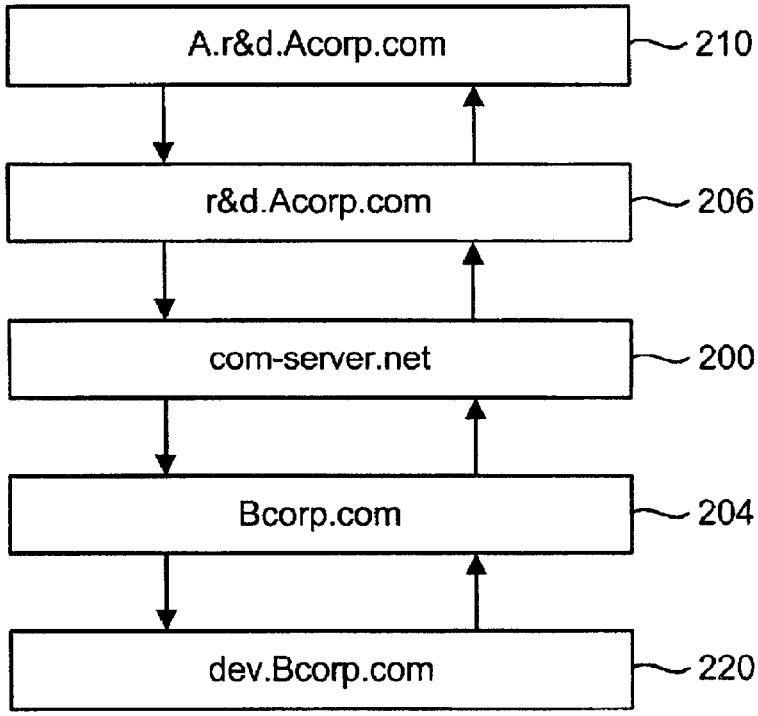
FIG. 7 shows how a domain name is resolved to obtain an IP address.

FIG. 7 provides an illustration of how a domain name is resolved into a global address and local address according to one embodiment [of the present invention]. A.R&D.Acorp.com 210 sends a request to r&d.Acorp.com 206 seeking resolution of the domain name for B. A process on r&d.Acorp.com 206 may ask a few of the nearby name servers to resolve B, but none are likely to have the information to resolve the name so it will send a name resolution request via one or more UDP packets to the server for .com (e.g. com-server.net 200). The process on com-server.net 200 does not know the address of B.lab.dev.Bcorp.com, but it knows all of its own children (e.g. Acorp.com,Bcorp.com, . . . ). Therefore, com-server.net 200 forwards the request to the name server for Bcorp.com 204. In turn, Bcorp.com 204 forwards a request to dev.Bcorp.com 220 which has the authoritative resource records for B.lab.dev.Bcorp.com.

In one embodiment [of the present invention], dev.Bcorp.com will use the domain name to access a table of resource records (e.g., similar to the table of FIG. 5) to locate $GIP_2$ and $LIP_B$. The global and local addresses are returned to Bcorp.com, which in turn returns the information to com-server.net 200, which returns the value to R&D.Acorp.com 206 which presents the information to the originator A.r&d.Acorp.com 210. Once the records get back to the r&d.Acorp.com 206 name server, they will be entered into a cache in case they are needed later. However, this information is not authoritative, since changes made at dev.Bcorp.com are not propagated to all of the caches in the world that may know about it. For this reason, cache entries should not live too long.

Figure 8:
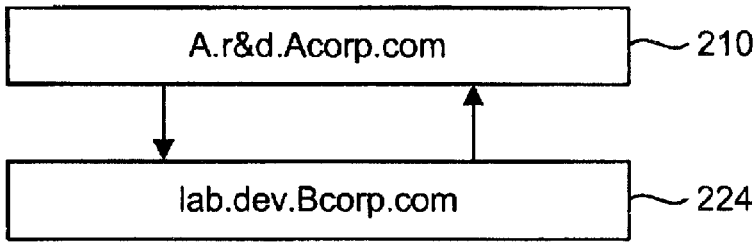
FIG. 8 shows how a domain name is used to obtain a local address.

In one embodiment of the steps of FIG. 7, the authoritative name server dev.Bcorp.com returns only the global address, and not the local address. Entity A must obtain the local address for B separately. In that embodiment, A will make a second domain name resolution request directly to the global address returned from the initial domain name resolution request. Thus, A will send a request directly to $GIP_2$, which is a request to lab.dev.Bcorp.com. This is illustrated in FIG. 8 which shows a.r&d.Acorp.com making a domain name resolution request directly to lab.dev.Bcorp-.com 224. Server 224 will keep a table which stores domain names and associated local addresses. Server 224 will use the domain name received in the request from server 210 to access the table and return the local address back to server 210.

In a different embodiment, host A can obtain the local address of host B by using an ICMP Echo Request. ICMP is a protocol used to test and control the Internet. ICMP uses the basic support of IP as if it were a higher level protocol; however, ICMP is actually an integral part of IP. ICMP messages are sent in several situations. For example, when a packet cannot reach its destination, when a gateway does not have the buffering capacity to forward a packet and when the gateway can direct the host to send traffic on a shorter route. The Internet Protocol is not designed to be absolutely reliable. The historical purpose of the ICMP control messages is to provide feedback about problems in the communications environment, not to make the Internet Protocol reliable.

Figure 9:
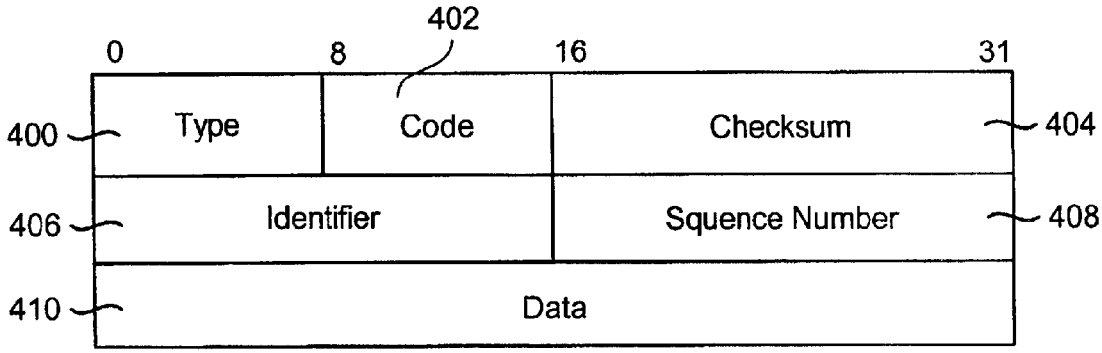
FIG. 9 depicts the format of an ICMP Echo message.

The ICMP message is sent inside the payload of an IP packet. FIG. 9 depicts the format of an ICMP Echo Request or Echo Reply message. Type field 400 of the ICMP message is set to 8 for Echo Request message and 0 for Echo Reply message. Code field 402 is one byte and is set to 0 for Echo Request messages and Echo Reply messages. Field 404 is a 16 bit check sum. The two byte identifier field 406 can be used to identify matching Echo Requests and Replies. Similarly, the two byte sequence number field 408 can also be used to match Echo Requests and Replies. For example, identifier 406 might be used like a port in TCP to identify a session and a sequence number 408 might be incremented on each Echo Request sent. The node processing the Echo Request returns the same values in the Echo Reply. Data 410 received in an Echo Request message is typically returned with the Echo Reply message.

Figure 10:
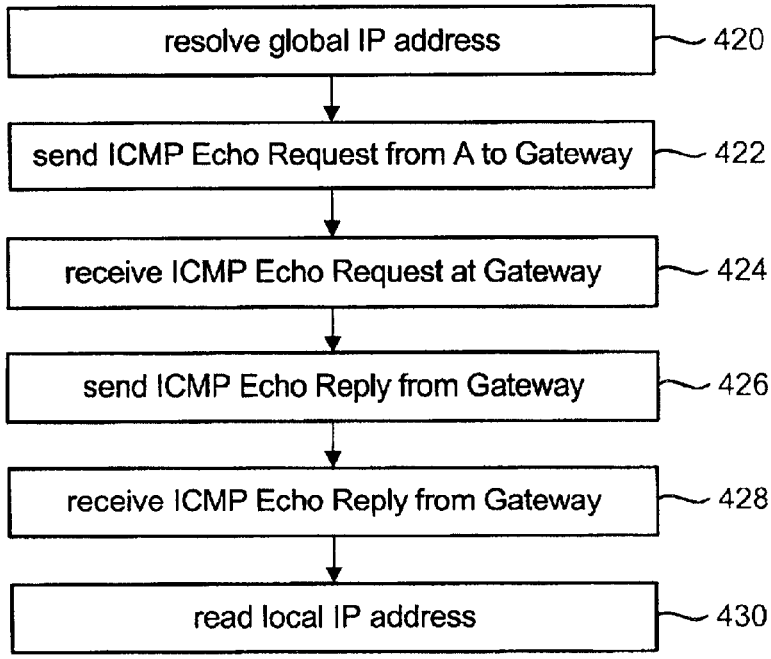
FIG. 10 is a flow chart describing the steps for using an ICMP Echo Request to obtain a local address.

FIG. 10 provides a flow chart describing the process for obtaining IP addresses in the embodiment that obtains the local IP address using an ICMP Echo Request. In step 420, the domain name is resolved for a global IP address as described above with respect to FIG. 7. In step 422, host A sends an ICMP Echo Request to Gateway 2. The packet containing the ICMP Echo Request stores the domain name as described above. Gateway 2 stores a table for translating domain names to local addresses. In step 424, the ICMP Echo Request is received at Gateway 2 Recognizing the domain name, in step 426, Gateway 2 sends an ICMP Echo Reply back to host A. Data portion 410 of the IMCP echo reply stores the local address for B. In other embodiments, the local address can be stored in other portions of the packet. The local address for B can be appended to the end of a packet's payload. In step 428 host A receives the ICMP Echo Reply from Gateway 2. In step 430, A reads the local IP address. In one embodiment, Gateway 2 can send the ICMP Echo Request rather than host A.

Figure 11:
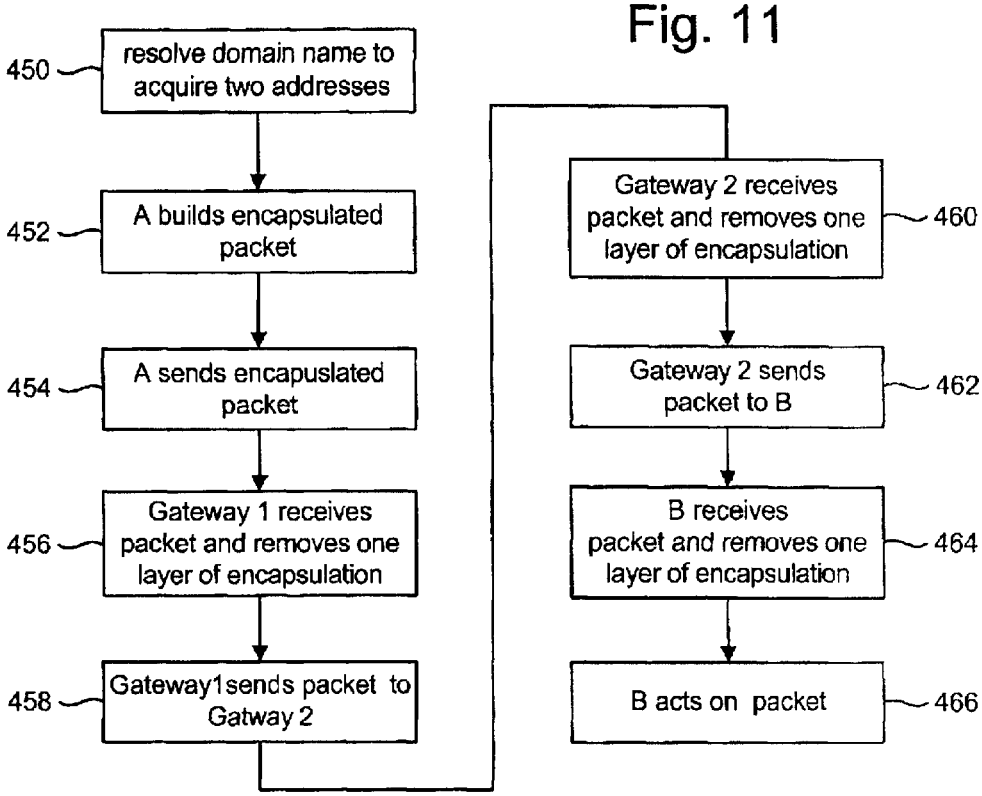
FIG. 11 is a flow chart describing the steps for communicating a message from a first entity to a second entity according to one embodiment [of the present invention].

Once A has the necessary global and local addresses, A can initiate communication with B. FIG. 11 is a flow chart describing the steps for A to initiate communication with B. In step 450, A resolves the domain name to acquire the local and global addresses (e.g. $GIP_1$ and $LIP_B$). In step 452, A builds a packet that is encapsulated within a single protocol level.

Figure 12:
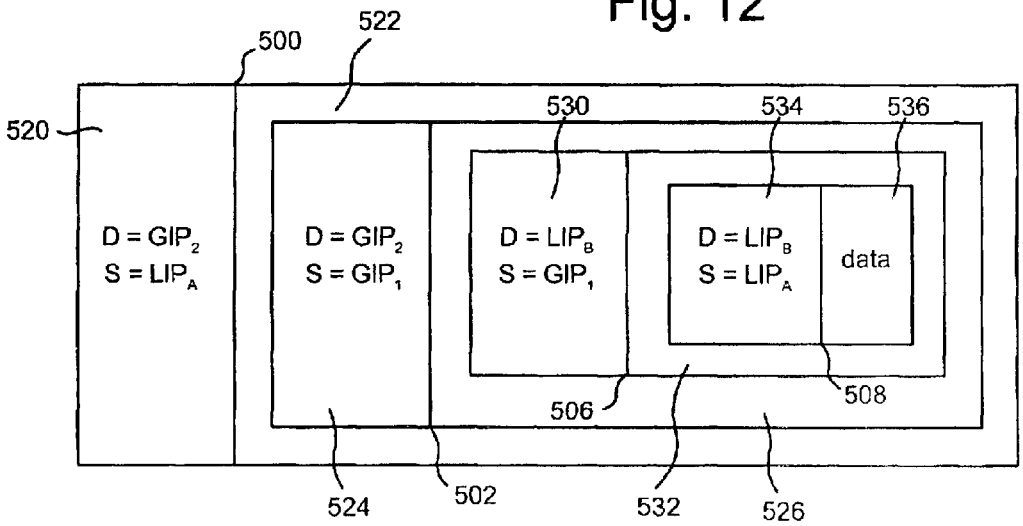
FIG. 12 is a first example of an encapsulated packet.

FIG. 12 provides an example of an encapsulation within a single protocol level. That is, the levels of the encapsulation are in the same protocol level. In one example, each level of encapsulation is an IP packet. FIG. 12 depicts 4 packets: 500, 502,506 and 508. Packet 500 includes header portion 520 and payload portion 522. Header portion 520 stores a destination address of $GIP_2$ and a source address of $LIP_A$. Payload 522 stores packet 502. In one embodiment, header portion 520 can store a destination address of $LIP_1$.

Packet 502 includes a header portion 524 and payload portion 526. Header portion 524 stores a destination address of $GIP_2$ and a source address of $GIP_1$. Payload field 526 stores packet 506.

Packet 506 includes header portion 530 and payload portion 532. Header portion 530 stores a destination address of $LIP_B$ and a source address of $GIP_1$. Payload portion 532 stores packet 508. In another embodiment, header portion 530 can include a source address of $LIP_2$.

Packet 508 includes header portion 534 and payload portion 536. Header portion 534 stores a destination address of $LIP_B$ and source address of $LIP_A$. Payload portion 536 stores the data being communicated from A to B. The set of encapsulated packet depicted in FIG. 12 (and other Figures) have an appropriate numbers of levels of encapsulation based on the number of gateways or other intermediate devices. If more gateways or other intermediate devices are used, more levels of encapsulation will be used.

Step 452 of FIG. 11 includes building the encapsulated packet of FIG. 12. In step 454, host A sends the encapsulated packet of FIG. 12 toward host B. In step 456, the encapsulated packet of FIG. 12 is received by Gateway 1. Gateway 1 removes the outermost level of encapsulation. For example, in the encapsulated packet of FIG. 12, Gateway 1 removes packet 500 so that only packets 502, 506 and 508 remain. In step 458, Gateway 1 sends the remaining encapsulated packet (which includes packets 502, 506, and 508) to Gateway 2. In step 460, Gateway 2 receives the encapsulated packet and removes one layer of encapsulation. For example, Gateway 2 removes packet 502, the outer most packet. In step 462, Gateway 2 sends the remaining encapsulated packet to host B. In step 464, host B receives the remaining encapsulated packet (with packet 506 and packet 508) and removes the outermost layer of encapsulation. For example, B removes packet 506 and stores the destination and source addresses from header portion 530. In step 466 B acts on packet 508 which is the data desired to be transmitted from A to B. In one embodiment, the data from payload 536 is communicated to the TCP protocol layer software.

Figure 13:
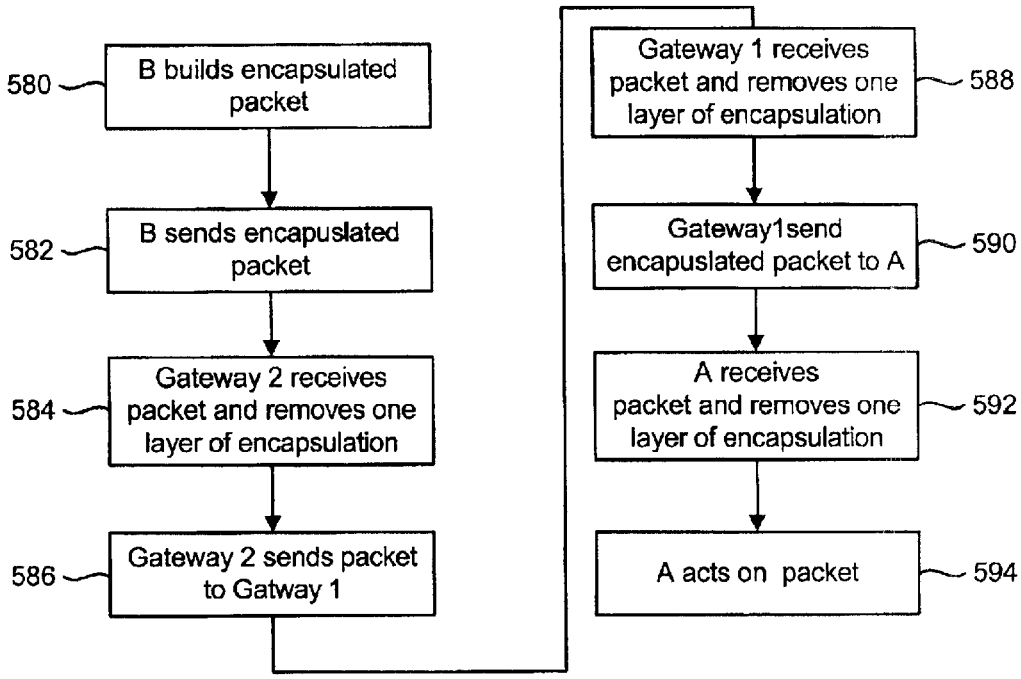
FIG. 13 is a flow chart describing the steps for responding to a message from a first entity according to one embodiment [of the present invention].
Figure 14:
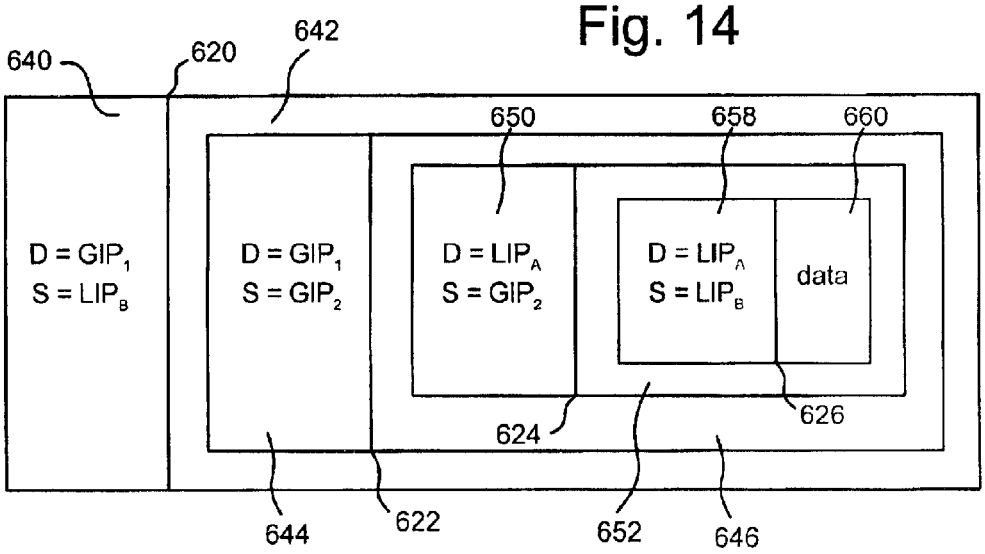
FIG. 14 is an example of an encapsulated packet.

FIG. 13 provides a flow chart explaining how B responds back to A after the steps of FIG. 11. In step 580, B builds an encapsulated packet to be sent to host A as a reply. FIG. 14 as an example of an encapsulated packet created by B in step 580. FIG. 14 provides an example of encapsulation with a single protocol level. That is, packets 620, 622, 624 and 626 are all IP packets. Packet 620 includes a header 640 and payload 642. Header 640 stores a destination address of $GIP_1$ and a source address of $LIP_B$. Payload 642 stores packet 622.

Packet 622 includes header portion 644 and data payload 646. Header portion 644 stores a destination address of $GIP_1$ and a source address of $GIP_2$. Payload 646 stores packet 624.

Packet 624 includes a header portion 650 and payload portion 652. Header portion 650 stores a destination address $LIP_A$ and a source address of $GIP_2$. Payload portion 652 stores packet 626.

Packet 626 includes a header portion 658 and payload portion 660. Header portion 658 stores a destination address $LIP_A$ and a source address of $LIP_B$. Payload portion 660 stores data to be sent from B to A.

In step 582 of FIG. 13, B sends encapsulated packet 620 to A. In step 584, Gateway 2 receives encapsulated packet 620 and removes one layer of encapsulation. That is, Gateway 2 removes packet 620 leaving packet 622, packet 624 and packet 626. In step 586, Gateway 2 sends packet 622 (encapsulating packets 624 and 626) to Gateway 1. In step 588, Gateway 1 receives packet 622 and removes one layer of encapsulation. That is, Gateway 1 removes packet 622. In step 590, Gateway 1 sends encapsulated packet 624 to A. In step 592, A receives encapsulated packet 624 and removes one layer of encapsulation. That is, A removes packet 624, leaving packet 626. Entity A also stores the destination and source addresses from header 650. In step 594, A acts on the original packet 626 meant for transmission from B to A. In one embodiment, data from payload portion 660 is communicated to TCP protocol software on entity A. Note that the above embodiment uses domain names, local addresses, global addresses and encapsulation at the network layer. Other embodiments use the same technology at other layers (e.g. transport layer) of the network.

One embodiment of the present invention makes use of pseudo addresses. More information about pseudo addresses can be found in PSEUDO ADDRESSING, Bruce C. Wootton and Hasan S. Alkhatib, U.S. Application Serial No. 09/637,803, filed on Aug. 11, 2000, incorporated herein by reference. The use of pseudo addresses insulates the application from addressing formats of the lower level protocols, allows for communication to continue after an entity has changed addresses and allows the socket interface for an application to remain the same when using the present invention.

Figure 15:
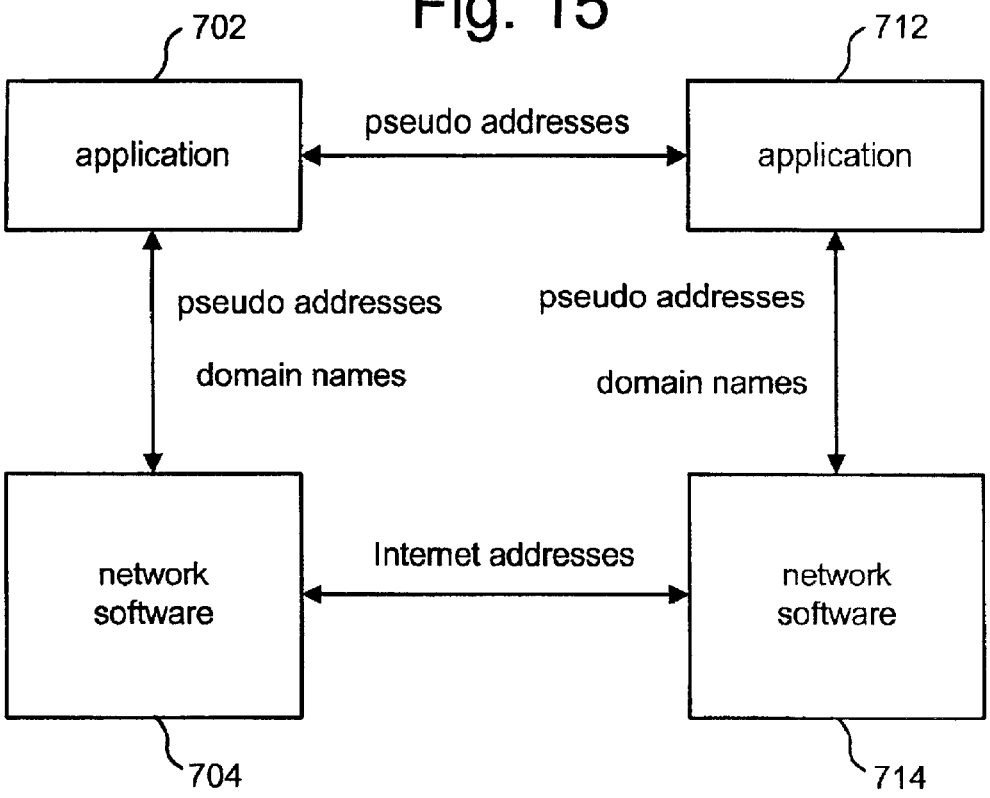
FIG. 15 is a block diagram explaining the use of pseudo addresses.

FIG. 15 is a block diagram illustrating the use of pseudo addresses. A pseudo address in its most generic form is an identification of an entity that is different from the entity's actual address. In one embodiment, the pseudo address is a random address chosen to identify a particular entity. The randomly chosen address is not the entity's actual address. In one alternative, the pseudo address is in the format for IPv4 addresses. Depicted in FIG. 15 are application 702 and network software 704, which are both running on a single computer (in one embodiment). Network software 704 pertains to software at the transport layer, network layer, and other layers. Application software 702 pertains to software at the application layer. FIG. 15 also shows application 712 and network software 714, both of which are running on a single computer (in one embodiment). In one example, application 702 communicates with application 712. According to the current invention, both applications 702 and 712 use pseudo addresses to communicate with each other. However, in actuality, application 702 communicates with application 712 using network software 704 and network software 714. Application 702 identifies application 712 to network software 704 using a domain name and a pseudo address. Network software 704 communicates with network software 714 using Internet addresses (e.g. global addresses). In one example, network software 704 and network software 714 use IPv4 addresses. Other address formats can also be used, including IPv6. Application 712 identifies application 702 to network software 714 using a pseudo address and a domain name. Thus, from the point of view of the application software, the pseudo addresses are being used to identify the applications. Therefore, if the Internet addresses of the two computers (or other entities) change, applications 702 and 712 do not need to know about the change in the Internet addresses, including changes in format, changes of actual address, etc. because the pseudo addresses have not changed. Additionally, because the applications are using pseudo addresses, the applications do not need to be concerned with the format or change of format of the IP addresses. Thus, an IPv4 application can be made to work with IPv6. Note that if application 702 asks network software 704 for its own IP address, then network 704 will respond with the pseudo address.

Figure 16:
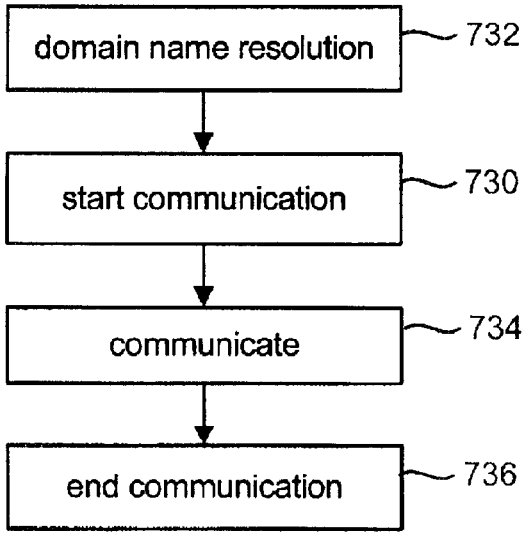
FIG. 16 is a flow chart describing one embodiment of a process for using pseudo addresses.

FIG. 16 is a flow chart describing a high level operation of one embodiment [of the present invention]. In step 730, the entity wishing to initiate communication performs a domain name resolution. For purposes of a first example, assume that entity A of FIG. 4 is attempting to initiate communication with entity B. In step 732, the communication is started. In step 734, the two entities communicate with each other. In step 736, the communication ends.

Figure 17:
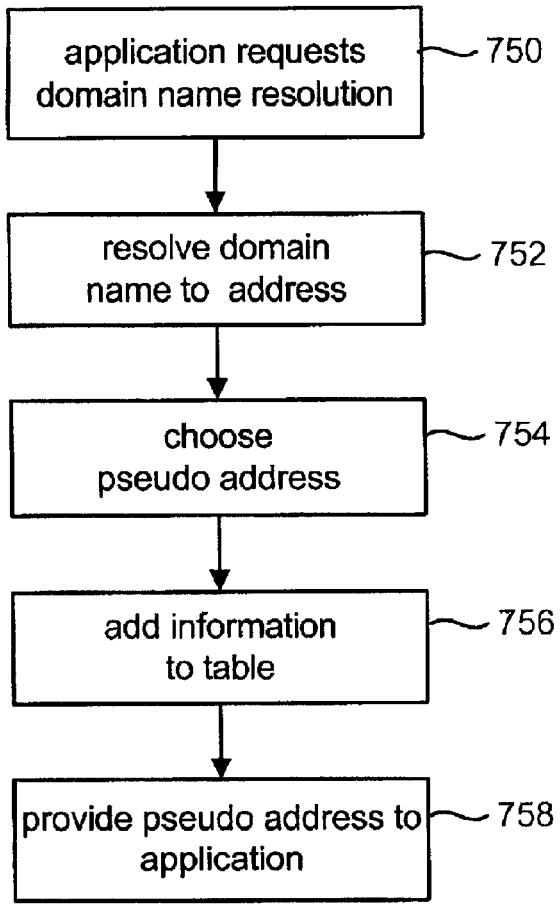
FIG. 17 is a flow chart describing a method for resolving a domain name and choosing a pseudo address.

FIG. 17 is a flow chart describing one embodiment of the method for domain name resolution, corresponding to step 732 of FIG. 16. For example purposes, assume that host/entity A is initiating communication to host/entity B. In step 750, the application software running on entity A requests a domain name resolution. In step 752, the network software on A will initiate a process that will result in the acquisition of global address $GIP_2$ and a local address $LIP_B$ for B. In step 754, the network software for entity A will chose a pseudo address. In one embodiment, the pseudo address is chosen randomly. In other embodiments, a list of pseudo addresses to choose from can be pre-stored. In the current example, the pseudo address is in the same format as typical IPv4 Internet addresses. In step 756, the pseudo address chosen in step 754, the global address resolved in step 752 and the local address resolved in step 752 are all stored in a table. In another embodiment, the domain name is also stored in the table. In step 758, the pseudo address is provided to the application software.

Figure 18:
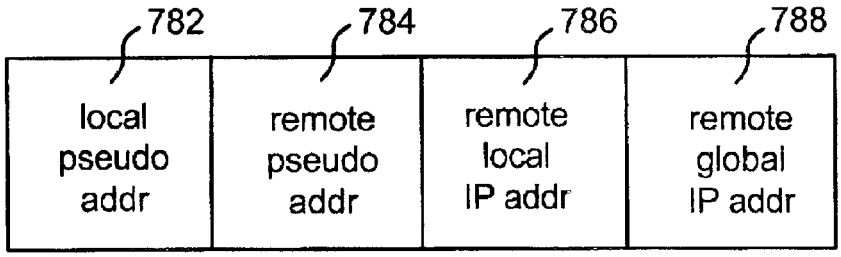
FIG. 18 depicts an entry in a table.

FIG. 18 shows an example of an entry in the table mentioned in step 756. The entry includes four fields: local pseudo address 782, remote pseudo address 784, remote local IP address 786 and remote global IP address 788. Using the example that entity A is initiating a communication with entity B, assume that the entry of Figure 18 is on a table stored on entity A. Thus, local pseudo address 782 is a pseudo address used by entity B to identify entity A. Remote pseudo address 784 is a pseudo address used by entity A to identify entity B. Remote local IP address 786 is the local address of entity B and remote global IP address 788 is a global IP address associated with entity B. Note that in some embodiments, a table may contain less than all four fields. In other embodiments, this information can be stored in data structures other than a table. The exact format of the data structure is not important [to the present invention].

Some embodiments of the present invention do not use a table. Rather, the information depicted in FIG. 18 (as well as other relevant information) can be stored in one or more of the encapsulated packets. For example, the information can be stored in a header of an IP packet, in a data portion of an IP packet, or as another level of encapsulation.

Figure 19:
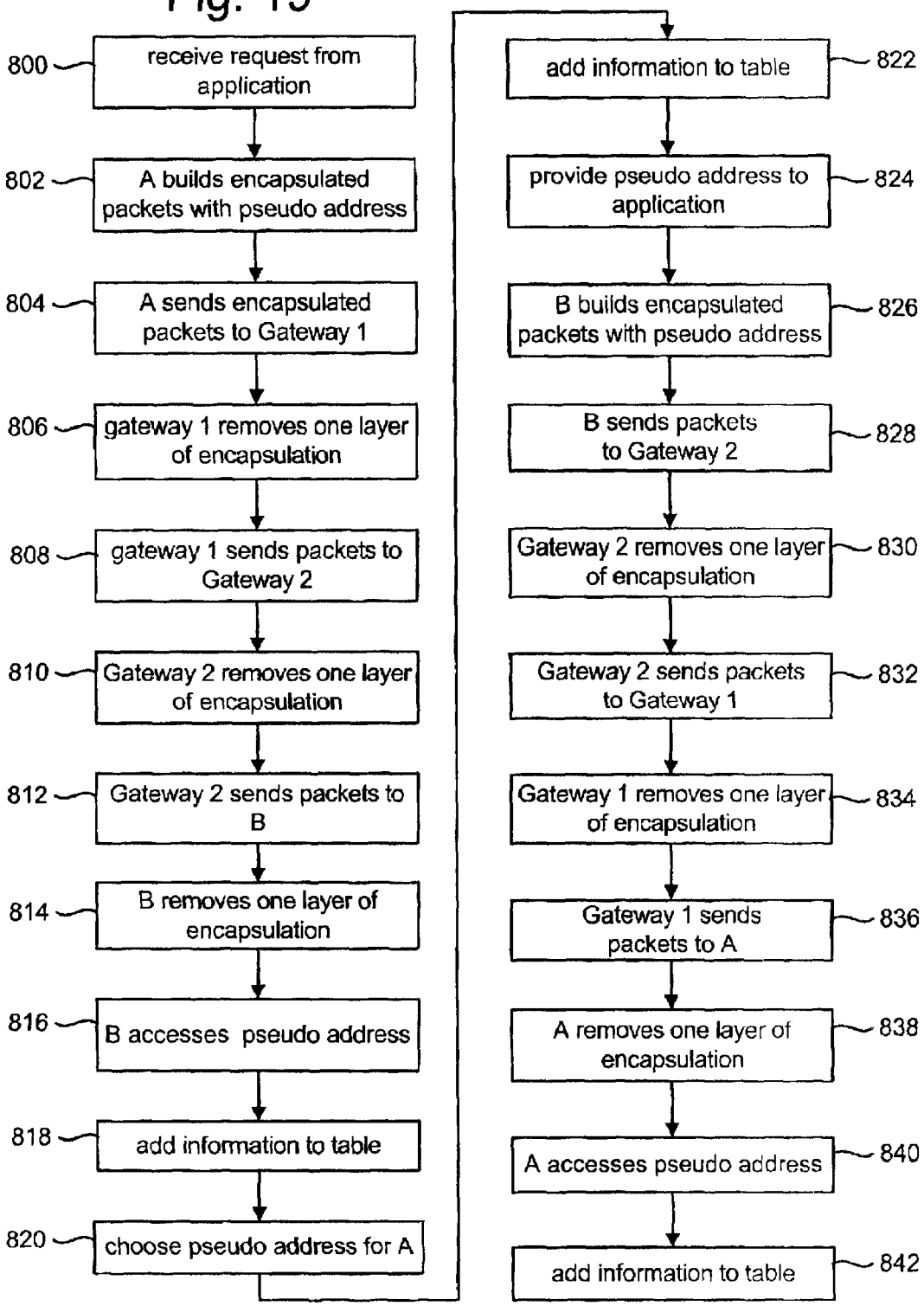
FIG. 19 is a flow chart describing a process for starting communication using pseudo addresses.

FIG. 19 is a flow chart describing the process of starting communication, which is step 730 of FIG. 16. In step 800, network software 704 of entity A receives a request from application 702 of entity A to communicate with application 712 of entity B. The request includes the pseudo address that application 702 uses to identify entity B. Alternatively, the request can include an identification of entity B by domain name or other means. In step 802, network software 704 of entity A builds a set of encapsulated packet which includes the pseudo address that entity A uses to identify entity B.

Figure 20:
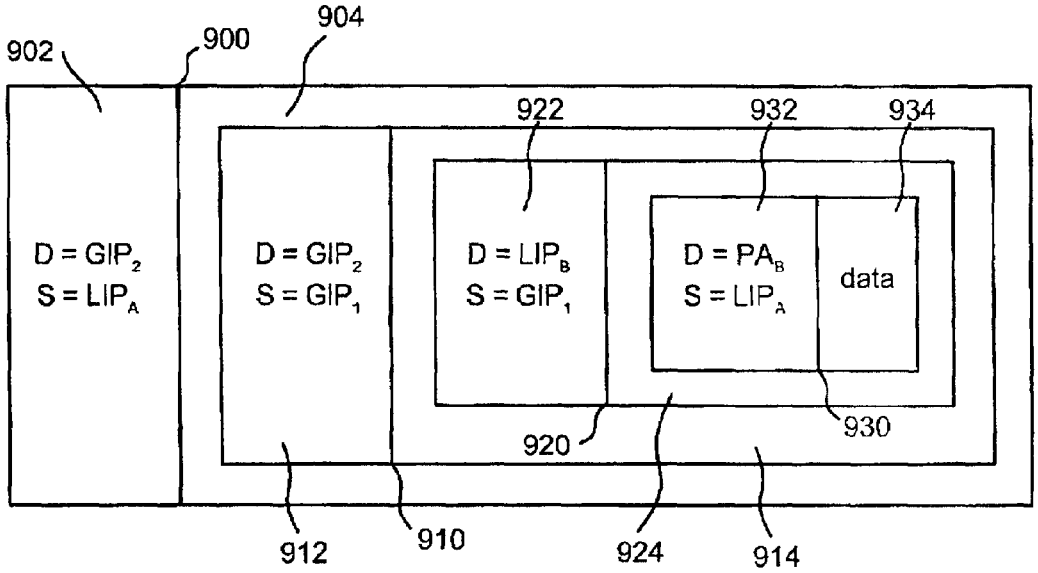
FIG. 20 depicts a set of encapsulated packets.

FIG. 20 provides an example set of encapsulated packets created in step 802.

FIG. 20 depicts 4 packets: 900, 910, 920 and 930 Packet 900 includes header portion 902 and payload portion 904. Header portion 902 stores a destination address of $GIP_2$ and a source address of $LIP_A$. Payload 904 stores packet 910. Packet 910 includes a header portion 912 and payload portion 914 Header portion 912 stores a 110 destination address of $GIP_2$ and a source address of $GIP_1$. Payload field 914 stores packet 920. Packet 920 includes header portion 922 and payload portion 924. Header portion 922 stores a destination address of $LIP_B$ and a source address of $GIP_1$. Payload portion 924 stores packet 930. Packet 930 includes header portion 932 and payload portion 934 Header portion 932 stores a source address of $LIP_A$ the destination address is the pseudo address $PA_B$, which is the pseudo address that A uses to refer to B. Payload portion 934 stores the data being communicated from A to B.

Looking back at FIG. 19, in step 804 host A sends the encapsulated packets of FIG. 20 toward host B. In step 806, the encapsulated packets are received by Gateway 1. Gateway 1 removes the outer most level of encapsulation. In step 808, Gateway 1 sends the remaining encapsulated packets to Gateway 2. In step 810, Gateway 2 receives the encapsulated packets and removes one layer of encapsulation.

In step 812, Gateway 2 sends the remaining encapsulated packets to host B. In step 814, host B receives the remaining encapsulated packets and removes the outer most layer of encapsulation. For example, B removes packet 920 and accesses packet 930. In step 816, host B accesses the pseudo address $PA_B$ that host A uses to identify host B. In step 818, host B stores $PA_B$, $LIP_A$ and $GIP_1$ in the table. In step 820, entity B chooses a pseudo address for referring to entity A. In step 822, the chosen pseudo address from step 820 is added to the table. In step 824, the pseudo address chosen in step 820 is provided to application 712 on entity B. In step 826, entity B builds a set of encapsulated packets, which include the pseudo addresses.

Figure 21:
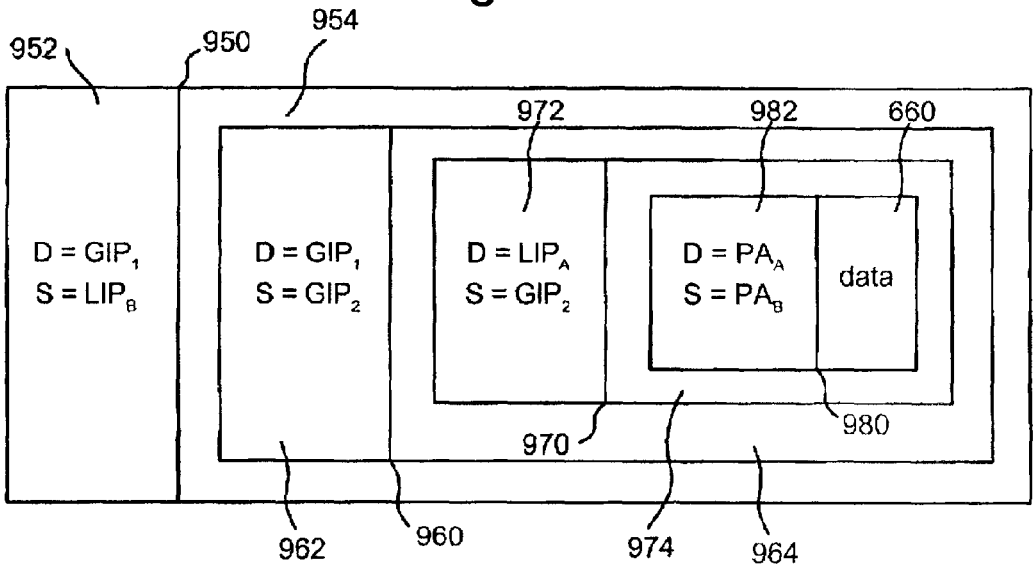
FIG. 21 depicts a set of encapsulated packets.

FIG. 21 depicts the set of encapsulated packets 950, 960, 970 and 980 created in step 826. Packet 950 includes header 952 and payload 954. Header 952 stores a destination address of $GIP_1$ and a source address of $LIP_B$. Payload 954 stores packet 960. Packet 960 includes header portion 962 and data payload 964 Header portion 962 stores a destination address of $GIP_1$, and a source address of $GIP_2$. Payload 964 stores packet 970. Packet 970 includes a header portion 972 and payload portion 974 Header portion 972 stores a destination address $LIP_A$ and a source address of $GIP_2$. Payload portion 974 stores packet 980. Packet 980 includes a header portion 982 and payload portion 984. Header portion 982 stores a destination address $PA_A$ and a source address of $PA_B$. $PA_A$ is the pseudo address chosen in step 820 and used by host B to refer to host A.

Looking back at FIG. 19, in step 828 B sends the encapsulated packets toward A. In step 830, Gateway 2 receives the encapsulated packets and removes the outermost layer of encapsulation. In step 832, Gateway 2 sends the remaining encapsulated packets to Gateway 1. In step 834, Gateway 1 receives the encapsulated packets and removes the outermost layer of encapsulation. In step 836, Gateway 1 sends the remaining encapsulated packet to entity A. In step 838, A receives the encapsulated packets and removes one layer of encapsulation. That is, A removes packet 970, leaving packet 980. In step 840, host A access the pseudo address $PA_B$ from packet 980. In step 842, the pseudo address $PA_B$ is entered into the table on entity A.

Figure 22:
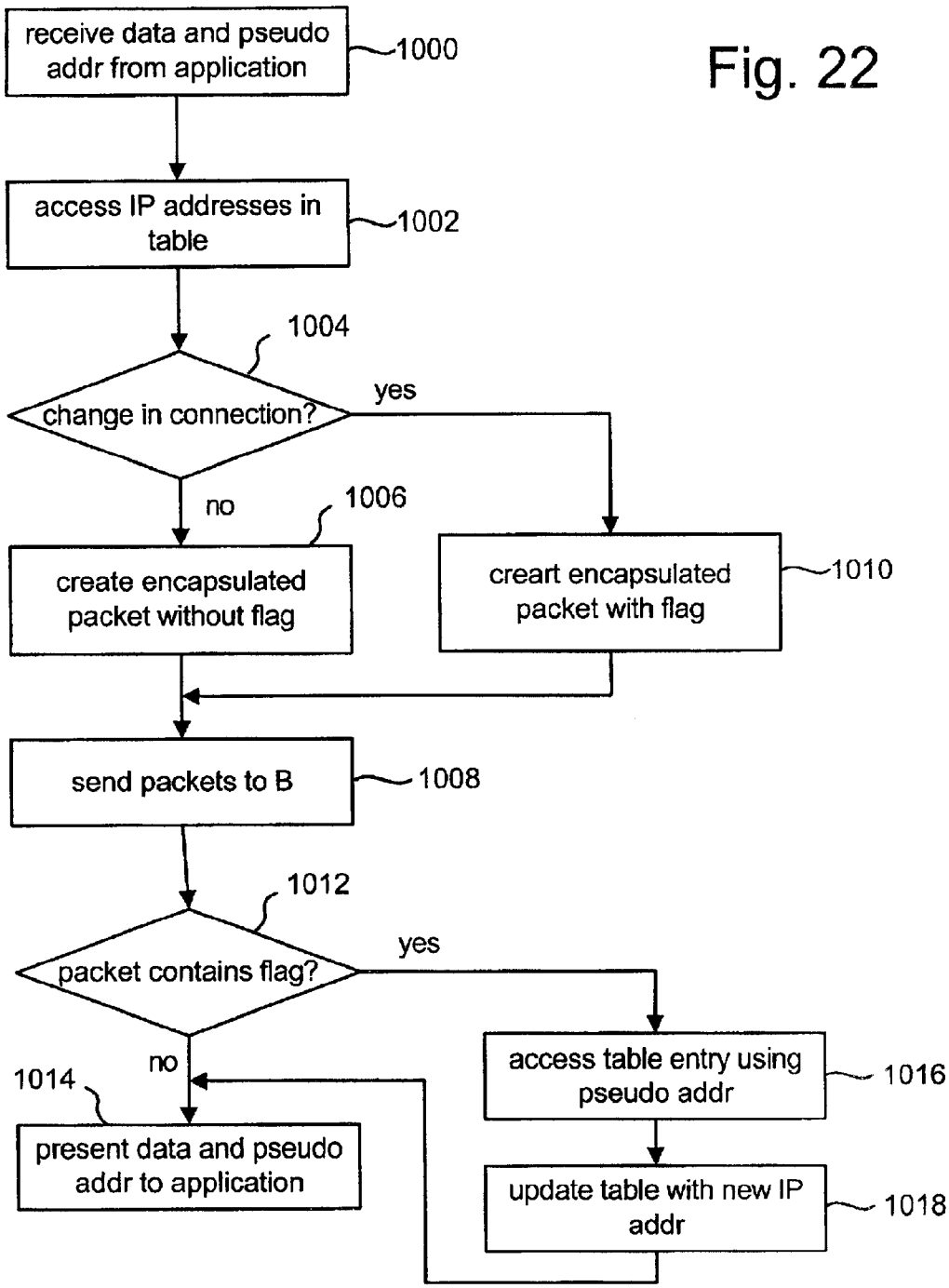
FIG. 22 is a flow chart describing a method for communicating.

FIG. 22 is a flow chart describing the process for communicating between entity A and entity B, which is step 734 of FIG. 16. In step 1000, network software 704 of entity A receives data and the pseudo address from application 702 of entity A as part of a request to send that data to entity B. In step 1002, network software 704 accesses the table using the pseudo address to identify the global address and local address for sending information to entity B. In step 1004, it is determined whether there has been a change in the connection. If there has not been a change in the connection, then in step 1006 a set of encapsulated packets is created that does not include a flag indicating a change in the connection.

During a communication between two entities, it is possible that the connection changes. For example, one of the entities may change its IP address. If one of the entities is a cellular telephone traveling between two distinct areas, the IP address may change when entering the new area. Other scenarios for an IP address changing also apply, as well as other reasons for changes in connections. If there is a change in connection (on the part of entity A) during communication, then (at step 1004) the method loops to step 1010. In step 1010, the set of encapsulated packets are created and include a flag indicating that there has been a change in the connection. In one embodiment, the flag can be in the payload portion of a packet, can be in the options field of a packet, can be another packet encapsulated in the above mentioned set of packets, etc. In another alternative, a separate message can be sent from A to B to indicate the change in the connection. The separate message can be sent using an existing protocol or a newly created protocol.

Figure 23:
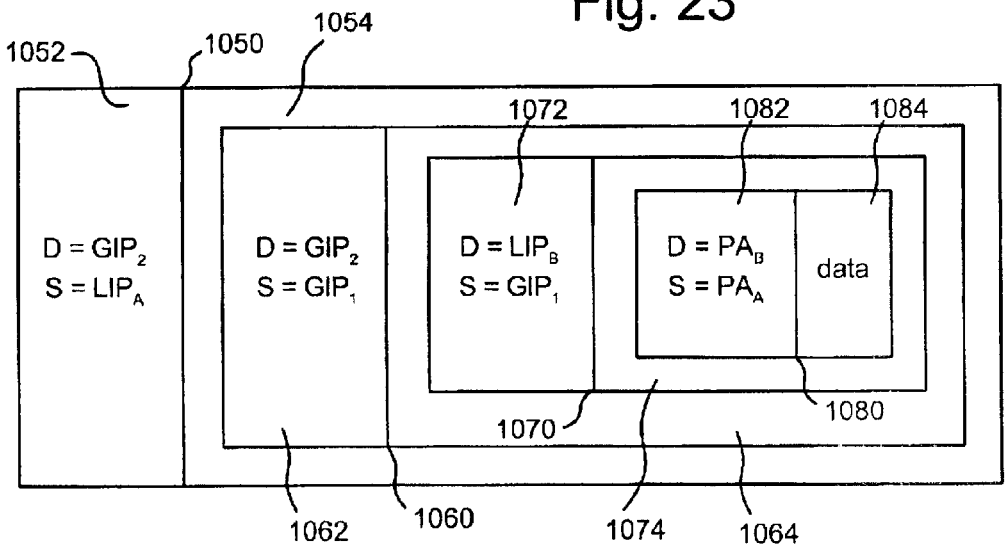
FIG. 23 depicts a set of encapsulated packets.

FIG. 23 depicts an exemplar set of encapsulated packets 1050, 1060,1070, 1080 created in step 1006. Step 1010 would include creating a similar packet, but with the appropriate flag (in one embodiment). Packet 1050 includes header portion 1052 and payload portion 1054. Header portion 1052 stores a destination address of $GIP_2$ and a source address of $LIP_A$. Payload 1054 stores packet 1060. Packet 1060 includes a header portion 1062 and payload portion 1064 Header portion 1062 stores a destination address of $GIP_2$ and a source address of $GIP_1$. Payload field 1064 stores packet 1070. Packet 1070 includes header portion 1072 and payload portion 1074 Header portion 1072 stores a destination address of $LIP_B$ and a source address of $GIP_1$. Payload portion 1074 stores packet 1080 Packet 1080 includes header portion 1082 and payload portion 1084. Header portion 1082 stores a source address of $PA_A$ and a destination address of $PA_B$.

After step 1006 or step 1010 of FIG. 22, the method loops to step 1008, and the packets are sent to entity B. In step 1012, entity B determines whether the packet contains the flag indicating that there has been a change in the connection. If the packet does not include the flag, then the data is presented to the application in step 1014. Additionally, in step 1014, the pseudo address for the source of the data is presented to the application. In some embodiments, the pseudo address of the destination can also be presented to the application. If, in step 1012, it is determined that the received packet includes the flag indicating that there has been a change in the connection, then 1016 and the table is accessed using the source's pseudo address in the packet (step 1016). This pseudo address is used to match the remote pseudo address field of one of the entries in the table. The table entry matching the pseudo address is then updated in step 1018 by replacing the remote global address or remote local address with the appropriate address from the received packets. After step 1018, the method loops to step 1014.

Figure 24:
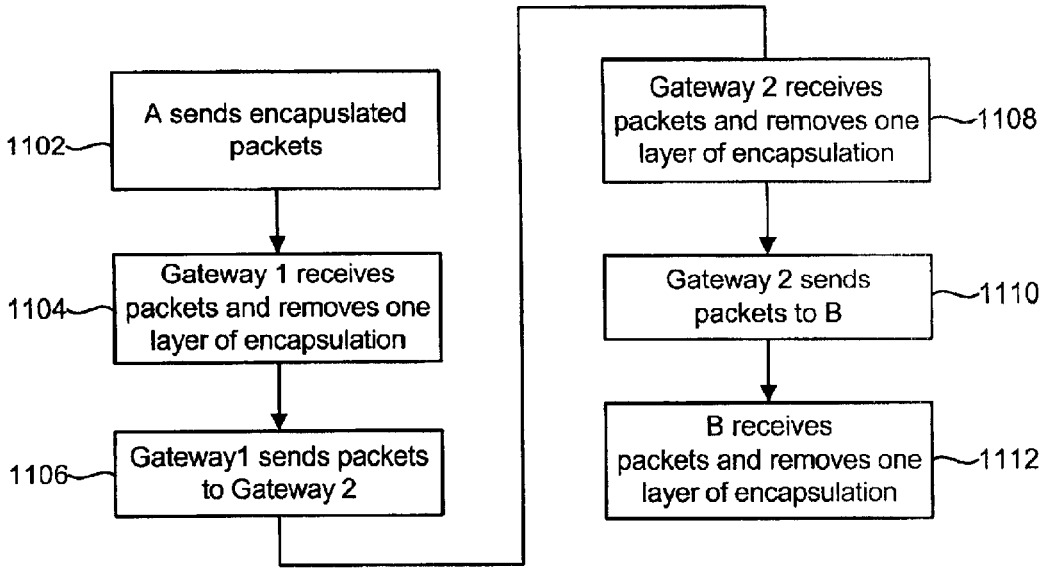
FIG. 24 is a flow chart describing a method for sending packets using pseudo addresses.

FIG. 24 is a flow chart describing the process sending the encapsulated packets (Step 1008 of FIG. 22). In step 1102, host A sends the encapsulated packets of FIG. 23 toward host B. In step 1104, the encapsulated packets are received by Gateway 1. Gateway 1 removes the outermost level of encapsulation (e.g. packet 1050). In step 1106, Gateway 1 sends the remaining encapsulated packets (1060, 1070, 1080) to Gateway 2. In step 1108, Gateway 2 receives the encapsulated packets and removes the outer layer of encapsulation (Packet 1060). In step 1110, Gateway 2 sends the remaining encapsulated packets (1070 and 1080) to host B. In step 1112, host B receives the remaining encapsulated packets and removes the outer packet 1070. At this point, packet 1080 can be accessed. When packet 1080 is accessed, entity B can access $PA_A$ and $PA_B$. In one embodiment, $PA_A$ is presented to the application on entity B. In another embodiment $PA_B$ can also be presented to the application on entity B. In yet another embodiment, packet 1080 would have the local address $LIP_A$ and $LIP_B$ as the source and destination, and entity B would use $LIP_A$ and $LIP_1$, to access the table to identify $PA_A$ for presentation to the application on entity B.

Packet 1080 was not used to route and was not altered during the communication. This enables preservation of the packet as is until it reaches the destination, allowing the application of IPsec to the original packet 1080. Such an arrangement allows for the use of IPsec end-to-end from source to destination. IPsec breaks if the content of the original packet is modified along the way. When IPsec is used (e.g. for a virtual private network), packet 1080 may be encrypted or otherwise protected for security/privacy reasons.

Figure 25:
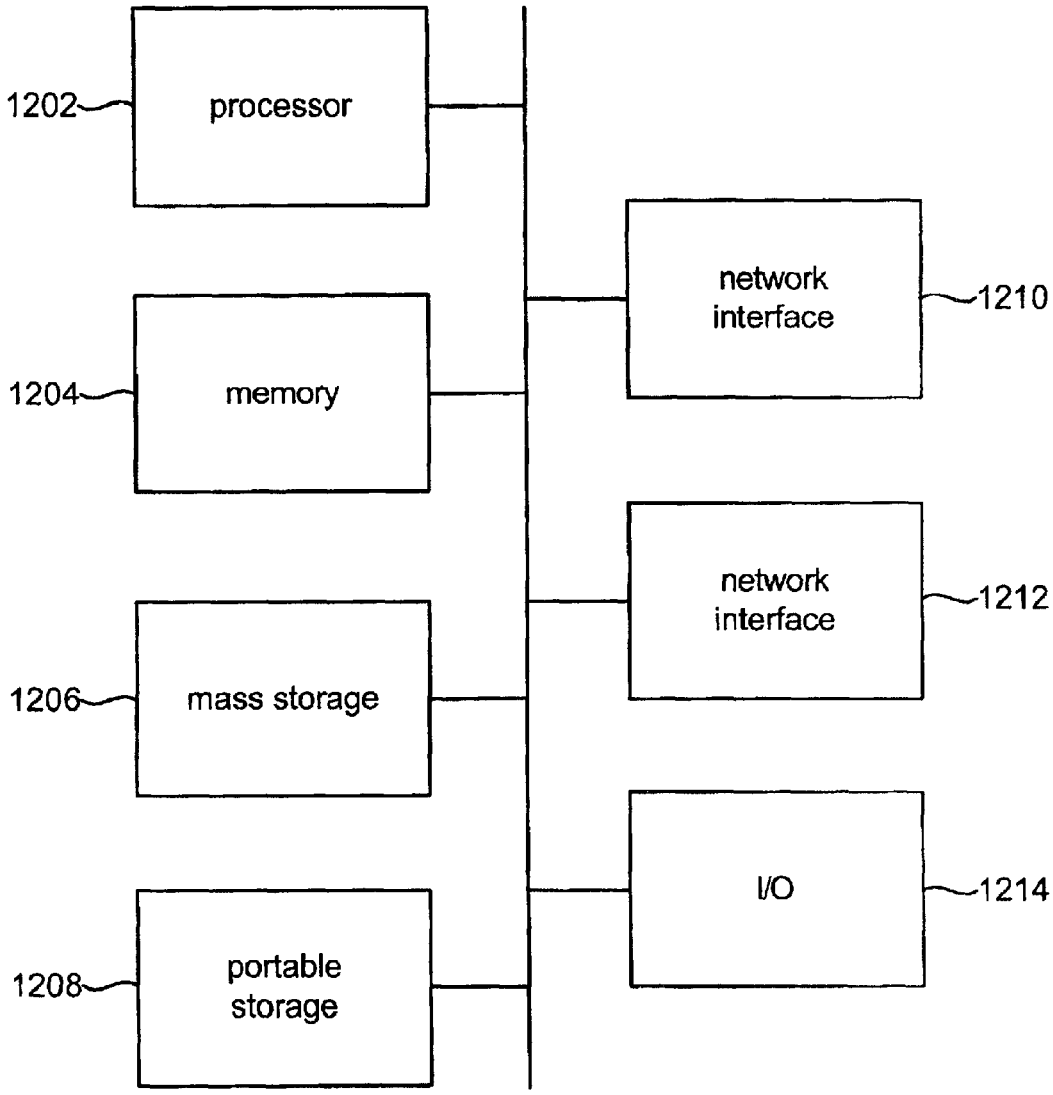
FIG. 25 is a block diagram of one embodiment of hardware suitable for use with [the present invention] *one or more embodiments*.

FIG. 25 shows one example of a hardware architecture for computers used [for the present invention]. The computer includes a processor 1202, a memory 1204, amass storage device 1206, a portable storage device 1208, a first network interface 1210, a second network interface 1212 and I/O devices 1214. The choice of processor is not critical as long as a suitable processor with sufficient speed is chosen. Memory 1204 could be any conventional computer memory. Mass storage device 1206 could include a hard drive, CD-ROM or any other mass storage device. Portable storage 1208 could include a floppy disk drive or other portable storage device. If the computer is acting as a router, it includes two or more network interfaces. In other embodiments, the computer could include only one network interface. The network interfaces can include network cards for connecting to an Ethernet or other type of LAN. In addition, one or more of the network interfaces can include or be connected to a firewall. For a gateway, one of the network interfaces will typically be connected to the Internet and the other network interface will typically be connected to a LAN. However, a gateway can exist physically inside a network. I/O devices 1214 can include one or more of the following: keyboard, mouse, monitor, display, printer etc. Software used to perform the methods of the present invention are likely to be stored in mass storage 1206 (or any form of non-volatile memory), a portable storage media (e.g. floppy disk or tape) and, at some point, in memory 1204. Various embodiments, versions, and modification of the system of Fig. 201 can be used to implement a gateway, a router, other host, etc. The above described hardware architecture is just one suitable example depicted in a generalized and simplified form. [The present invention] *Embodiments* could include dedicated hardware, a dedicated router with software to implement the invention or other software and/or hardware architectures that are suitable.

The foregoing detailed description of the invention has been presented for purposes of illustration and description. It is not intended to be exhaustive or to limit the [invention] *claims* to the precise form disclosed, and obviously many modifications and variations are possible in light of the above teaching. The described embodiments were chosen in order to [best] explain the principles of the invention and its practical application to thereby enable others skilled in the art to best utilize the invention in various embodiments and with various modifications as are suited to the particular use contemplated. [It is intended that the scope of the invention be defined by the claims appended hereto.]

We claim:

1. A method for communicating, comprising:

obtaining a first local address for a destination entity and a first global address associated with said destination entity, said destination entity is on a private network that uses said first local address to communicate with said destination entity;

creating a message that includes encapsulation within a single protocol level, said message includes said first local address as a first destination address and said first global address as a second destination address, said message includes a first IP packet, a second IP packet encapsulated in said first IP packet and a third IP packet encapsulated in said second IP packet; and communicating said message toward said destination.

2. A method for communicating, comprising:

obtaining a first local address for a destination entity and a first global address associated with said destination entity, said destination entity is on a private network that uses said first local address to communicate with said destination entity;

creating a message that includes encapsulations within a single protocol level, said message includes said first local address as a first destination address and said first global address as a second destination address;

communicating said message toward said destination entity;

receiving said message at an intermediate entity;

removing a layer of encapsulation from said message;

forwarding said message after said step of removing, toward said destination entity;

receiving said message at said destination entity;

removing a layer of encapsulation from said message; and accessing information in said message after said step of removing.

3. A method according to claim 2, further comprising the steps of:

providing a pseudo address to an application in said destination entity based on said message.

4. A method for communicating comprising:

receiving a message, said message includes encapsulation within a single protocol level, said message stores a first global address and a first local address as a destination address associated with a first entity, said first local address and said first global address correspond to said first entity, said first entity is on a private network, said first entity is reachable from outside the private network using said first local address and said first global address;

removing at least one level of encapsulation from said message, said message includes multiple levels of encapsulation after said step of removing; and accessing a remaining level of encapsulation, said step of accessing includes communicating said message toward said first entity using said first global address, said message includes said first local address and said first global address.

5. A method for communicating, comprising:

using a domain name to obtain a first local address for a destination entity and a first global address associated with said destination entity, said destination entity is on a private network that uses said first local address to communicate with said destination entity;

creating a message that includes said first local address as a first destination address, said first global address as a second destination address and a first pseudo address; and communicating said message toward said destination based on said first local address and said first global address.

6. A method according to claim 5, further comprising the step of:

receiving said first pseudo address from an application, said application uses said first pseudo address to address said destination, said step of receiving is performed prior to said step of creating a message.

7. A method according to claim 6, further comprising the step of:

receiving a second pseudo address, said step of creating a message includes adding said second pseudo address to said message, said destination uses said second pseudo address to reference a source, said step of communicating is performed by said source.

8. A method according to claim 7, further comprising the steps of:

receiving said message at said destination;

accessing said second pseudo address at said destination; and using said second pseudo address with an application on said destination.

9. A method according to claim 5, further comprising the step of:

receiving said first pseudo address, said destination uses said first pseudo address to reference a source, said step of communicating is performed by said source.

10. A method according to claim 9, further comprising the steps of:

receiving said message at said destination;

accessing said first pseudo address at said destination; and using said first pseudo address with an application on said destination.

11. A method according to claim 5, wherein:

said message includes encapsulation within a single protocol level.

12. A method according to claim 11, further comprising the steps of:

receiving said message at an intermediate entity, said first pseudo address is stored in an inner layer of said encapsulation;

removing an outer layer of said encapsulation at said intermediate entity without changing said inner layer of said encapsulation; and forwarding said message toward said destination.

13. A method according to claim 12, further comprising the steps of:

receiving said message at said destination;

removing another layer of said encapsulation at said destination;

accessing said first pseudo address at said destination; and using said first pseudo address with an application on said destination.

14. A method for communicating, comprising:

receiving a message at a destination, said message includes a local address and a global address corresponding to said local address, said destination is on a private network, said message is received from outside said private network based on a combination of said global address and said local address;

accessing a pseudo address corresponding to said local address and said global address; and using said pseudo address with an application.

15. A method according to claim 14, wherein:

said destination uses said pseudo address to refer to a source.

16. A method according to claim 14, wherein:

said destination uses said pseudo address to refer to said destination.

17. A method according to claim 14, wherein:

said message includes encapsulation within a single protocol level.

18. A method according to claim 17, further comprising the steps of:

removing a layer of encapsulation at said destination; and accessing said pseudo address in a remaining layer of said encapsulation.

19. A method according to claim 17, further comprising the steps of:

removing a layer of encapsulation at said destination; and accessing said pseudo address based on a remaining layer of said encapsulation.

20. One or more processor readable storage devices having processor readable code embodied on said processor readable storage devices, said processor readable code for programming one or more processors to perform a method comprising:

obtaining a first local address for a destination entity and a first global address associated with said destination entity, said destination entity is on a private network that uses said first local address to communicate with said destination entity;

creating a message that includes encapsulation within a single protocol level, said message includes said first local address as a first destination address and said first global address as a second destination address; and communicating said message toward said destination, said message includes a first IP packet, a second IP packet encapsulated in said first IP packet and a third IP packet encapsulated in said second IP packet.

21. One or more processor readable storage devices having processor readable code embodied on said processor readable storage devices, said processor readable code for programming one or more processors to perform a method comprising:

obtaining a first local address for a destination and a first global address for said destination;

creating a message that includes encapsulation within a single protocol level, said message includes said first local address and said first global address, said message includes a first IP packet, said message includes a second IP packet encapsulated in said first IP packet, said message includes a third IP packet encapsulated in said second IP packet, said message includes a fourth IP packet encapsulated in said third IP packet, said first IP packet includes said first global address as a first destination address and said second local address as a first source address, said second local address corresponds to said source entity, said second IP packet includes said first global address as a second destination address and a second global address as a second source address, said second global address corresponds to said source entity, said third IP packet includes said first local address as a third destination address and said second global address as a third source address, said fourth IP packet includes a pseudo address; and communicating said message toward said destination.

22. One or more processor readable storage devices having processor readable code embodied on said processor readable storage devices, said processor readable code for programming one or more processors to perform a method comprising:

receiving a message, said message includes encapsulation within a single protocol level, said message stores a first global address and a first local address as a destination address associated with a first entity, said first entity is on a private network, said first entity is reachable from outside the private network by a combination of the first local address and the first global address;

removing at least one level of encapsulation from said message; and accessing a remaining level of encapsulation, said message includes multiple levels of encapsulation after said step of removing, said step of accessing includes communicating said message toward said first entity using said first global address, said message includes said first local address and said first global address, and said message is an IP packet.

23. One or more processor readable storage devices having processor readable code embodied on said processor readable storage devices, said processor readable code for programming one or more processors to perform a method comprising:

receiving a message, said message includes encapsulation within a single protocol level, said message stores a first global address and a first local address as a destination address associated with a first entity, said first entity is on a private network said first entity is reachable from outside the private network by a combination of the first local address and the first global address;

removing at least one level of encapsulation from said message;

accessing a remaining level of encapsulation;

identifying a pseudo address based on said message; and providing said pseudo address to an application at said destination.

24. One or more processor readable storage devices having processor readable code embodied on said processor readable storage devices, said processor readable code for programming one or more processors to perform a method comprising:

receiving a message at a destination, said message includes a local address and a global address corresponding to said local address, said destination is on a private network, said message is received from outside the private network based on said global address and said local address;

accessing a pseudo address corresponding to said local address and said global address; and using said pseudo address with an application.

25. One or more processor readable storage devices according to claim 24, wherein:

said message includes encapsulation within a single protocol level.

26. One or more processor readable storage devices according to claim 24, wherein said method further comprises the steps of:

removing a layer of encapsulation at said destination; and accessing said pseudo address based on a remaining layer of said encapsulation.

27. An apparatus, comprising:

a communication interface;

a memory device; and one or more processor, said one or more processors programmed to perform a method comprising:

using a domain name to obtain a first local address for a destination entity and a first global address associated with said destination entity, said destination entity is on a private network that uses said first local address to communicate with said destination entity, creating a message that includes said first local address as a first destination address, said first global address as a second destination address and a first pseudo address, and communicating said message toward said destination based on said first local address and said first global address.

28. An apparatus according to claim 27, wherein said method further comprises the steps of:

receiving said first pseudo address from an application, said application uses said first pseudo address to address said destination, said step of receiving is performed prior to said step of creating a message.

29. An apparatus according to claim 27, wherein:

said message includes encapsulation within a single protocol level.

30. An apparatus, comprising:

a communication interface;

a memory device; and one or more processor, said one or more processors programmed to perform a method comprising:

receiving a message at a destination, said message includes a local address and a global address corresponding to said local address, said destination is on a private network, said message is received from outside the private network based on said global address and said local address, accessing a pseudo address corresponding to said local address and said global address, and using said pseudo address with an application.

31. An apparatus according to claim 30, wherein:

said message includes encapsulation within a single protocol level.

32. An apparatus according to claim 30, wherein said method further comprises the steps of:

removing a layer of encapsulation at said destination; and accessing said pseudo address based on a remaining layer of said encapsulation.

*33. A method for communicating, comprising:*

*obtaining a first local address for a destination entity and a first global address associated with said destination entity, said destination entity on a private network that uses said first local address to communicate with said destination entity;*

*creating a message that includes encapsulation within a single protocol level, said message includes said first*

*local address as a first destination address and said first global address as a second destination address; and*

*communicating said message toward said destination entity, said message encapsulated effective to enable an intermediate entity associated with said first global address to remove a layer of encapsulation from said message and forward to said destination entity based on said first local address and effective to enable said destination entity to remove another layer of encapsulation from said message to access information in said message.*

*34. An apparatus, comprising:*

*a communication interface;*

*a memory device; and*

*one or more processors, said one or more processors programmed to perform a method comprising:*

*obtaining a first local address for a destination entity and a first global address associated with said destination entity, said destination entity of a private network that uses said first local address to communicate with said destination entity;*

*creating a message that includes encapsulation within a single protocol level, said message including said first local address as a first destination address and said first global address as a second destination address, wherein said message includes a first IP packet, a second IP packet encapsulated in said first IP packet, and a third IP packet encapsulated in said second IP packet; and*

*communicating said message toward said destination.*

*35. An apparatus according to claim 34, wherein:*

*said first IP packet includes said first local address; and*

*said second IP packet includes said first global address.*

*36. An apparatus according to claim 34, wherein:*

*said message includes a fourth IP packet encapsulated in said third IP packet;*

*said first IP packet includes said first local address and a second local address as a first source address, said second local address corresponds to a source entity;*

*said second IP packet includes said first global address and a second global address as a second source address, said second global address corresponds to said source entity, said third IP packet includes said first local address as a third destination address and said second global address as a third source address, and said fourth IP packet includes a pseudo address.*

*37. An apparatus, comprising:*

*a communication interface;*

*a memory device; and*

*one or more processors, said one or more processors programmed to performed a method comprising:*

*obtaining a first local address for a destination entity and a first global address associated with said destination entity, said destination entity of a private network that uses said first local address to communicate with said destination entity;*

*creating a pseudo-address for said destination;*

*creating a message that includes encapsulation within a single protocol level, said message including said first local address as a first destination address, said first global address as a second destination address, and said pseudo-address for said destination; and*

*communicating said message toward said destination.*

*38. An apparatus, comprising:*

*a communication interface;*

*a memory device; and*

*one or more processors, said one or more processors programmed to perform a method comprising:*

*receiving a message, said message including encapsulation within a single protocol level, said message storing a first global address and a first local address, said first global address corresponding to a first entity, said first entity of a private network, said first entity reachable from outside the private network by a combination of the first local address and the first global address;*

*removing at least one level of encapsulation from said message; and*

*accessing any remaining level of encapsulation, wherein:*

*said message including multiple levels of encapsulation after said step of removing;*

*said step of accessing including communicating said message toward said first entity using said first global address, said message including said first local address and said first global address; and*

*said message being an IP packet.*

*39. An apparatus according to claim 38, wherein:*

*prior to said step of removing, said message includes a first packet, a second packet encapsulated in said first packet, a third packet encapsulated in said second packet and a fourth packet encapsulated in said third packet;*

*said first packet includes said first global address as a first destination and a second local address as a first source, said second local address corresponds to a source entity;*

*said second packet includes said first global address as a second destination and a second global address as a second source, said second global address corresponds to said source entity; and*

*said third packet includes said first local address as a third destination.*

*40. An apparatus, comprising:*

*a communication interface;*

*a memory device; and*

*one or more processors, said one or more processors programmed to perform a method comprising:*

*receiving a message, said message including encapsulation within a single protocol level, said message storing a first global address and a first local address, said first global address corresponding to a first entity, said first entity of a private network, said first entity reachable from outside the private network by a combination of the first local address and the first global address;*

*removing at least one level of encapsulation from said message;*

*accessing any remaining level of encapsulation;*

*identifying a pseudo address based on said message; and*

*providing said pseudo address to an application.*

* * * * *

UNITED STATES PATENT AND TRADEMARK OFFICE

CERTIFICATE OF CORRECTION

PATENT NO. : RE 41,024 E
APPLICATION NO. : 12/267325
DATED : December 1, 2009
INVENTOR(S) : Alkhatib et al.

It is certified that error appears in the above-identified patent and that said Letters Patent is hereby corrected as shown below:

In Drawing Sheet 13 of 14, Figure 22, Box 1010, line 1, delete "creart" and insert -- create --, therefor.

In column 6, line 9, delete "designated" and insert -- designed --, therefor.

In column 17, line 16, delete "address" and insert -- addresses --, therefor.

In column 17, line 17, delete "$LIP_1$" and insert -- $GIP_1$ --, therefor.

In column 18, line 31, in Claim 2, delete "encapsulations" and insert -- encapsulation --, therefor.

In column 23, line 52, in Claim 37, delete "performed" and insert -- perform --, therefor.

Signed and Sealed this

Twenty-third Day of February, 2010

David J. Kappos

David J. Kappos
*Director of the United States Patent and Trademark Office*